United States Patent
Link et al.

(10) Patent No.: US 9,936,672 B2
(45) Date of Patent: Apr. 10, 2018

(54) LATCHING MECHANISM FOR PET ENCLOSURE

(71) Applicant: Precision Pet Products, Inc., Costa Mesa, CA (US)

(72) Inventors: David Link, Costa Mesa, CA (US); Hongkun Liang, Zhongshan (CN)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 0 days.

(21) Appl. No.: 14/706,870

(22) Filed: May 7, 2015

(65) Prior Publication Data
US 2016/0024824 A1    Jan. 28, 2016

Related U.S. Application Data

(60) Provisional application No. 62/027,479, filed on Jul. 22, 2014.

(51) Int. Cl.
*A01K 1/03* (2006.01)
*E05C 3/12* (2006.01)
*E06B 3/52* (2006.01)

(52) U.S. Cl.
CPC ............. *A01K 1/03* (2013.01); *A01K 1/034* (2013.01); *E05C 3/12* (2013.01); *E06B 3/52* (2013.01)

(58) Field of Classification Search
CPC ...... A01K 1/0017; A01K 1/033; A01K 1/034; A01K 1/0236; A01K 1/0245; A01K 1/00; A01K 1/03; A01K 1/031; A01K 1/032; A01K 1/035; A01K 1/0356; A01K 1/10; A01K 1/105; A01K 31/06; A01K 31/07; A01K 31/08; A01K 31/10; E05C 3/12; E05B 65/52
See application file for complete search history.

(56) References Cited

U.S. PATENT DOCUMENTS

| | | | | |
|---|---|---|---|---|
| 2,693,786 A | * | 11/1954 | Babros | A01K 31/10 119/459 |
| 2,796,648 A | | 6/1957 | Peterson | |
| 2,942,314 A | | 6/1960 | Debner et al. | |
| 3,044,800 A | | 7/1962 | Wicker | |
| 3,127,205 A | * | 3/1964 | Griffiths | E05C 19/14 292/113 |
| 3,152,823 A | * | 10/1964 | Batterson | A01K 1/03 292/288 |

(Continued)

FOREIGN PATENT DOCUMENTS

CN    201123292    10/2008

OTHER PUBLICATIONS www.packagingandfastening.com, "Hartco Clinch Clips", 5 pages.

(Continued)

*Primary Examiner* — Monica L Williams
*Assistant Examiner* — Michael A. Fabula
(74) *Attorney, Agent, or Firm* — Global IP Counselors, LLP

(57) ABSTRACT

A latching mechanism having a camming surface to engage the latching mechanism without human intervention when a door is traversed from an opened position to a closed position is disclosed. Other latching mechanisms are also disclosed. The latching mechanism may also be rotatable to engage the latching mechanism and prevent opening of the door from the closed position.

8 Claims, 40 Drawing Sheets

(56) References Cited

U.S. PATENT DOCUMENTS

| | | | |
|---|---|---|---|
| 3,318,624 A * | 5/1967 | Poe | E05C 19/145 |
| | | | 292/113 |
| 3,499,674 A * | 3/1970 | Burkholder | A01K 31/005 |
| | | | 119/481 |
| 3,516,043 A | 6/1970 | Spofford | |
| 3,526,934 A | 9/1970 | Owen, Sr. | |
| 3,894,706 A | 7/1975 | Mizusawa | |
| 3,896,766 A | 7/1975 | Martin | |
| 3,907,150 A * | 9/1975 | Jurasek | B65D 7/20 |
| | | | 220/485 |
| 3,912,313 A * | 10/1975 | Pigorsh | E05C 3/048 |
| | | | 292/258 |
| 4,016,833 A | 4/1977 | Ray | |
| 4,140,080 A | 2/1979 | Snader | |
| 4,148,113 A | 4/1979 | Dvorachek | |
| 4,213,643 A * | 7/1980 | Blind | E05C 19/14 |
| | | | 292/247 |
| 4,484,540 A * | 11/1984 | Yamamoto | A01K 1/0245 |
| | | | 119/497 |
| 4,527,512 A | 7/1985 | Sugiura | |
| 4,528,768 A | 7/1985 | Anderson | |
| 4,588,216 A * | 5/1986 | Hinds | E05C 19/14 |
| | | | 292/113 |
| 4,590,885 A | 5/1986 | Sugiura | |
| 4,602,812 A * | 7/1986 | Bourne | E05C 19/145 |
| | | | 292/113 |
| 4,762,085 A | 8/1988 | Ondrasik | |
| 4,763,606 A | 8/1988 | Ondrasik | |
| 4,769,876 A | 9/1988 | Platt | |
| 4,852,290 A | 8/1989 | Wallace et al. | |
| 4,917,047 A | 4/1990 | Wazeter, III | |
| 5,058,863 A | 10/1991 | Maffet | |
| 5,071,176 A * | 12/1991 | Smith | E05C 9/06 |
| | | | 292/42 |
| 5,097,796 A | 3/1992 | Reimers | |
| D326,076 S | 5/1992 | Wiese | |
| 5,167,246 A | 12/1992 | Mortenson | |
| 5,233,939 A | 8/1993 | Randolph | |
| 5,331,725 A | 7/1994 | Chou | |
| 5,335,618 A | 8/1994 | Zarola | |
| 5,402,596 A | 4/1995 | Gillming, Jr. | |
| 5,482,005 A | 1/1996 | Thom | |
| 5,499,850 A * | 3/1996 | Sharp | A01K 1/0245 |
| | | | 292/347 |
| 5,544,619 A | 8/1996 | Braun | |
| 5,549,073 A | 8/1996 | Askins et al. | |
| 5,564,367 A | 10/1996 | Boyanton | |
| 5,628,098 A | 5/1997 | Askins et al. | |
| 5,653,194 A | 8/1997 | Guy | |
| D384,443 S | 9/1997 | Olfert | |
| 5,727,502 A | 3/1998 | Askins et al. | |
| 5,752,470 A | 5/1998 | Koneke | |
| 5,943,982 A | 8/1999 | Askins et al. | |
| 5,950,568 A | 9/1999 | Axelrod et al. | |
| 5,967,089 A | 10/1999 | Allen | |
| 5,988,110 A * | 11/1999 | Peterson | A01K 1/03 |
| | | | 119/453 |
| 6,003,908 A * | 12/1999 | King | E05C 1/04 |
| | | | 292/61 |
| 6,012,940 A | 1/2000 | Wheeler | |
| 6,092,488 A | 7/2000 | Allawas | |
| 6,152,081 A | 11/2000 | Baker | |
| 6,155,206 A | 12/2000 | Godshaw | |
| 6,192,834 B1 | 2/2001 | Kolozsvari | |
| 6,305,869 B1 | 10/2001 | Chen | |
| 6,405,414 B1 | 6/2002 | Byrnes et al. | |
| D473,838 S | 4/2003 | Wang | |
| 6,582,169 B1 | 6/2003 | Cano-Rodriguez et al. | |
| 6,631,590 B1 | 10/2003 | Glowaski | |
| 6,681,720 B1 * | 1/2004 | Skurdalsvold | A01K 1/03 |
| | | | 119/461 |
| 6,706,045 B2 | 3/2004 | Lin et al. | |
| 6,783,162 B1 * | 8/2004 | Harper | A01K 1/0245 |
| | | | 292/336.3 |
| 6,796,589 B2 | 9/2004 | Dolman | |
| 6,799,534 B1 | 10/2004 | Wang | |
| 6,883,463 B2 | 4/2005 | Link | |
| 7,017,520 B2 | 3/2006 | Wang | |
| 7,316,506 B2 | 1/2008 | Deonarine | |
| 7,805,808 B2 | 10/2010 | Matteson | |
| D631,740 S | 2/2011 | Wood | |
| 7,918,188 B1 | 4/2011 | Harper | |
| 8,733,293 B2 | 5/2014 | Link et al. | |
| 8,925,492 B2 | 1/2015 | Cantwell et al. | |
| 8,973,964 B2 | 3/2015 | Link et al. | |
| 2002/0100431 A1 | 8/2002 | Sherman et al. | |
| 2003/0057722 A1 | 3/2003 | Dolman | |
| 2003/0108385 A1 | 6/2003 | Finco et al. | |
| 2005/0034679 A1 * | 2/2005 | Link | A01K 1/0245 |
| | | | 119/474 |
| 2006/0260972 A1 | 11/2006 | Ayers | |
| 2006/0266298 A1 * | 11/2006 | Tsai | A01K 31/06 |
| | | | 119/481 |
| 2007/0210597 A1 | 9/2007 | Wang | |
| 2008/0110412 A1 * | 5/2008 | Shimoda | A01K 1/034 |
| | | | 119/473 |
| 2008/0282991 A1 * | 11/2008 | Krasoff | A01K 1/034 |
| | | | 119/456 |
| 2009/0314220 A1 | 12/2009 | Groh et al. | |
| 2010/0258059 A1 * | 10/2010 | Lott | A01K 1/0245 |
| | | | 119/499 |
| 2010/0294206 A1 * | 11/2010 | Kaneda | A01K 1/03 |
| | | | 119/501 |
| 2010/0300371 A1 | 12/2010 | Oeltjen et al. | |
| 2011/0132274 A1 | 6/2011 | Cagle | |
| 2012/0181808 A1 | 7/2012 | Reed et al. | |
| 2012/0186529 A1 | 7/2012 | Cantwell et al. | |
| 2012/0186530 A1 * | 7/2012 | Cantwell | A01K 1/0245 |
| | | | 119/474 |
| 2012/0210947 A1 | 8/2012 | DiPaolo | |
| 2012/0227328 A1 | 9/2012 | Link | |
| 2013/0152867 A1 | 6/2013 | Kaneda et al. | |
| 2014/0109839 A1 | 4/2014 | Cantwell et al. | |
| 2014/0116347 A1 * | 5/2014 | Casto | A01K 1/03 |
| | | | 119/474 |
| 2014/0216354 A1 | 8/2014 | Cantwell et al. | |
| 2015/0047572 A1 | 2/2015 | Rybka et al. | |

OTHER PUBLICATIONS www.raising-rabbits.com, "Rabbit Cage Plans: Build Your Own All-Wire Cages", 5 pages.
www.efinch.com, "Building an All Wire Finch Cage", 4 pages.
Precision Pet Products, "Suitcase Crate", 5 pages.
Precision Pet Products, Inc., "Wire Crates, Exercise Pens and Accessories", published at least as early as 2007.
Midwest Homes for Pets, "Championshiop Collection", published at least as early as 1992.
Midwest Homes for Pets, Product Description Sheet, published at least as early as 1995.
Doskocil, "The First and Only Large Collapsible Plastic Crates", published at least as early as 1995.
Gogo Pet Products, "Double Door Black Expoxy Folding Wire Crate—24 Inch".
Photograph of pet enclosure, Mar. 11, 2004, Exhibit A.
Photograph of pet enclosure, Mar. 11, 2004, Exhibit B.
Photograph of pet enclosure, Jan. 12, 2006, Exhibit C.

* cited by examiner

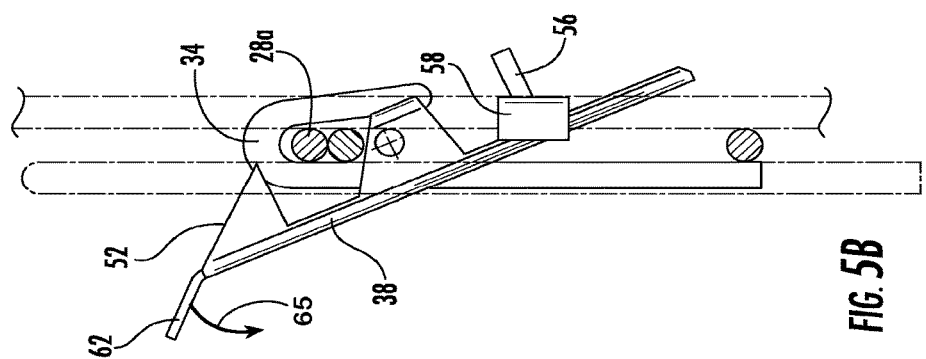
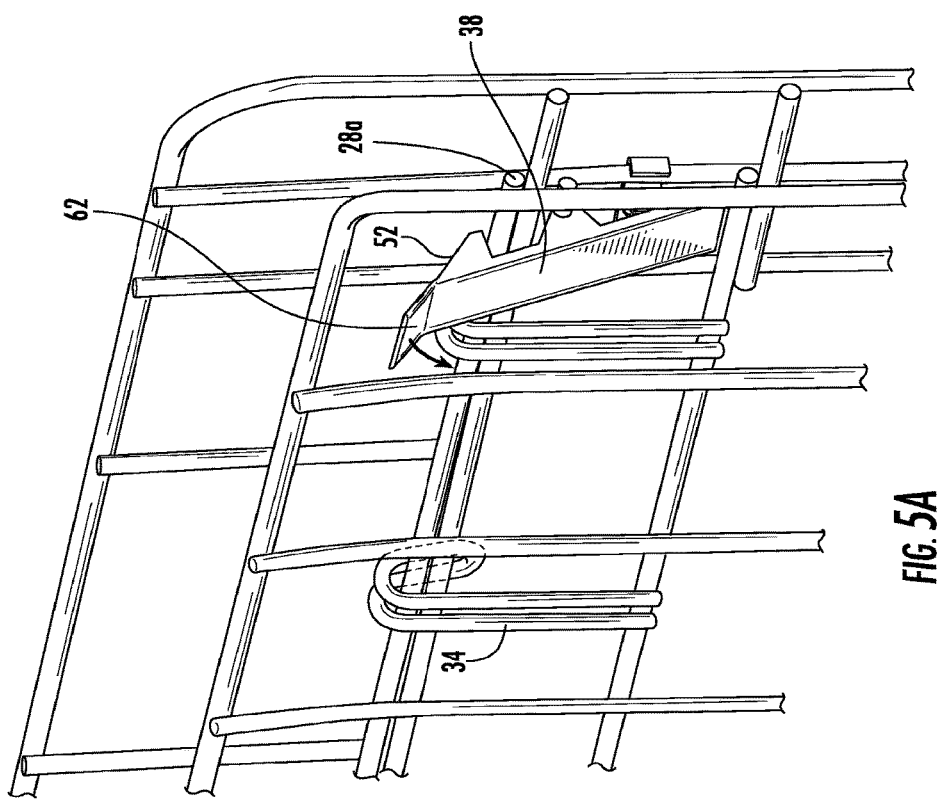
FIG. 5B
FIG. 5A

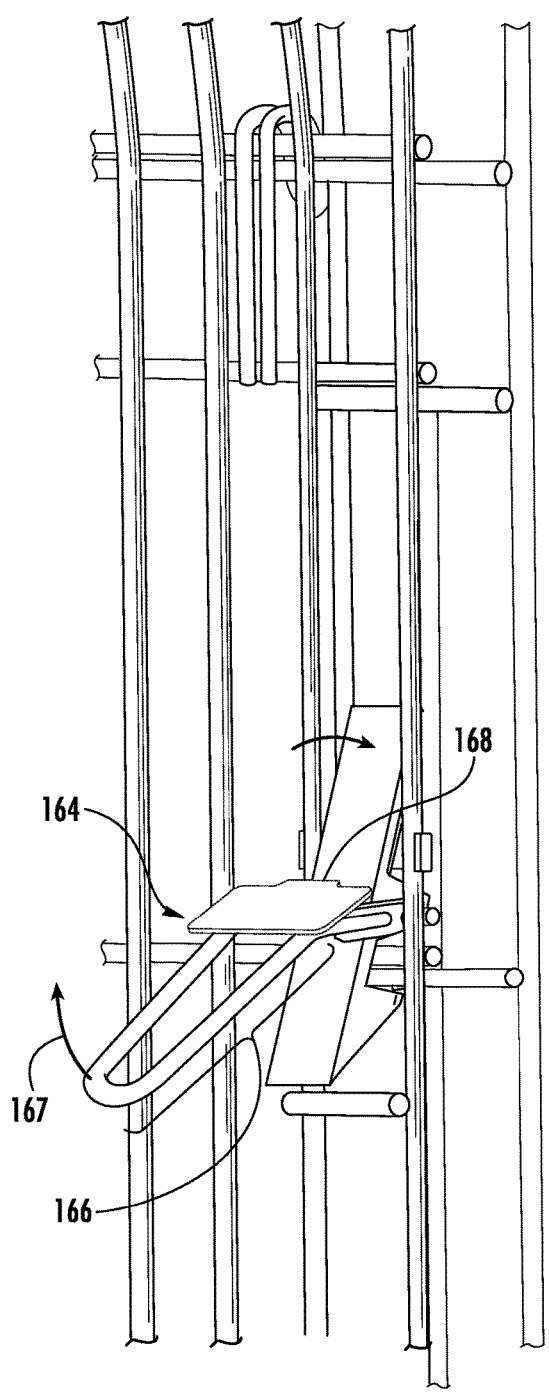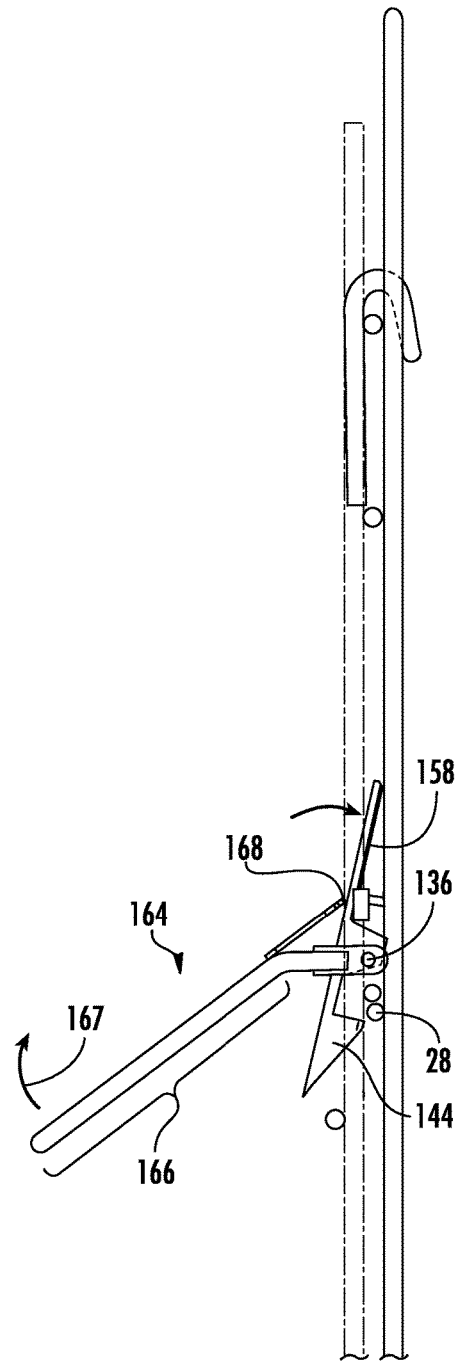
FIG. 12A
FIG. 12B

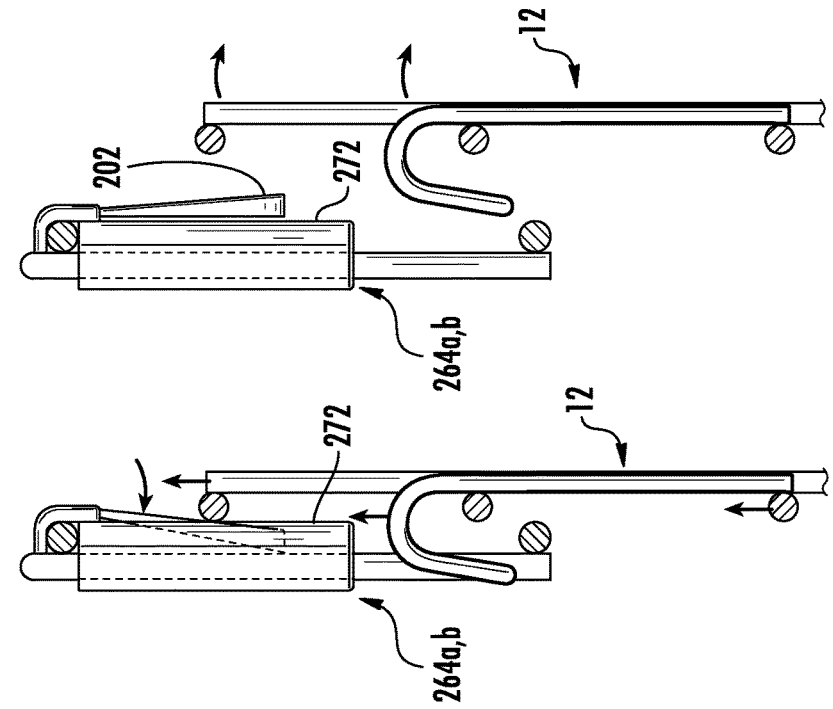
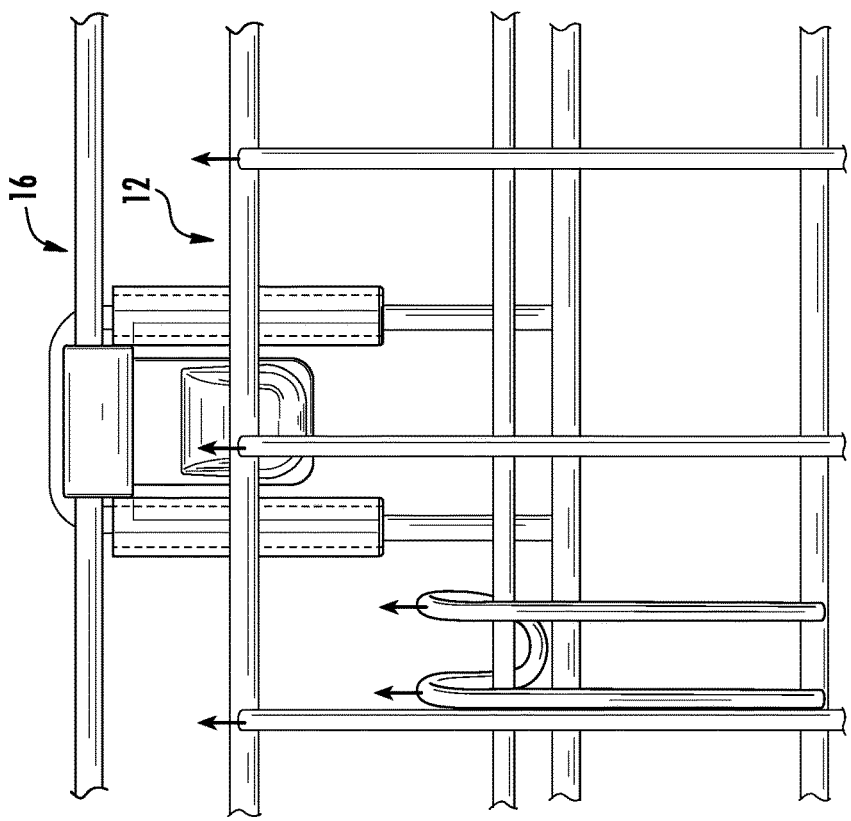
FIG. 21C
FIG. 21B
FIG. 21A

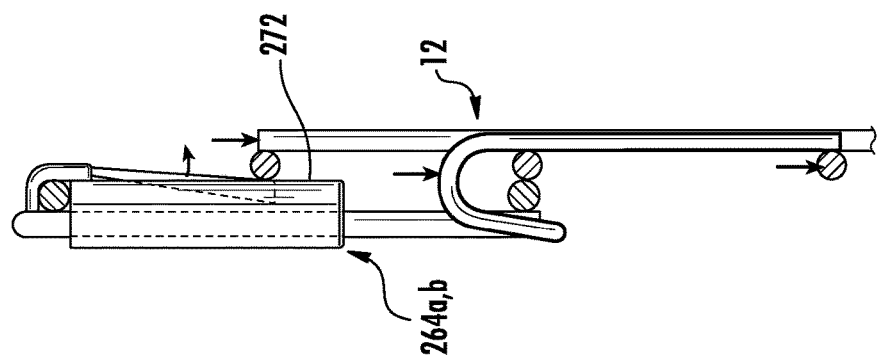
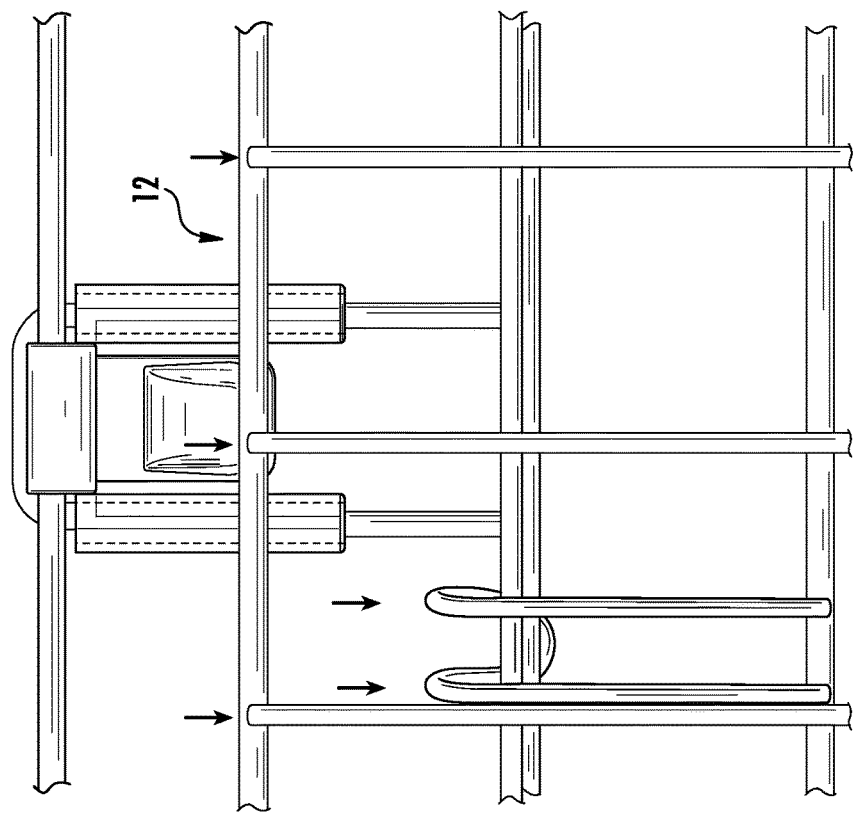
FIG. 23B
FIG. 23A

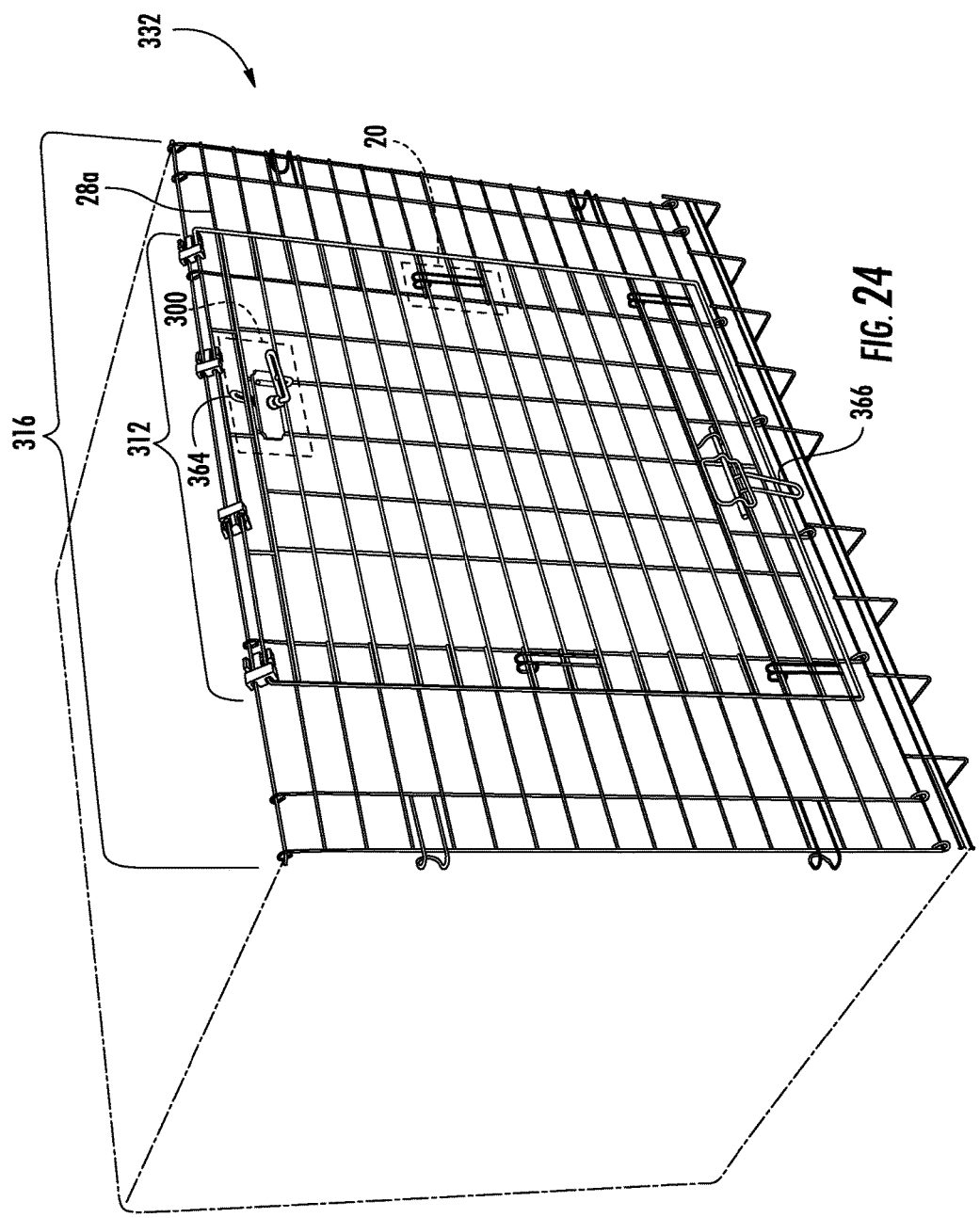

LATCHING MECHANISM FOR PET ENCLOSURE

CROSS-REFERENCE TO RELATED APPLICATIONS

The present application claims priority to, and the benefit of, U.S. Provisional Application Ser. No. 62/027,479 entitled "Latching Mechanism For Pet Enclosure" filed Jul. 22, 2014, the disclosure of which is herein incorporated by reference in its entirety.

STATEMENT RE: FEDERALLY SPONSORED RESEARCH/DEVELOPMENT

Not Applicable

BACKGROUND

The various embodiments and aspects described herein relate to a latching mechanism for a door of a wire framed panel.

Pet crates are enclosures which contain animals such as dogs in order to transport or potty train the animal. These pet crates are typically fabricated from a plurality of crisscrossing wire rods formed as panels and erected into a box configuration to trap the animal in the pet crate. One or more side panels may have a door to allow the animal to enter or exit the pet crate. These doors must be locked to the closed position so that the animal cannot open the door against the desire of the animal handler and also provide ease-of-use so that the animal handler can easily close and open the door as well as lock the door when in the closed position. Unfortunately, these door mechanisms are cumbersome to use.

Accordingly, there is a need in the art for an improved latching mechanism.

BRIEF SUMMARY

A latching mechanism is disclosed herein wherein the latching mechanism prevents the opening of the door by the animal when the door is in the closed position to prevent entry or exit of the animal through an opening of the door. The latching mechanism disclosed herein may be implemented on a door that is horizontally or vertically pivotable. The latching mechanism does not interfere with a secondary locking mechanism that hooks the door onto the panel when the door is in the closed position.

More particularly, a pet enclosure for restraining a pet within an area is disclosed. The enclosure may comprise at least one panel, a door and a latch. The at least one panel may be fabricated from a plurality of horizontal and vertical wire rods. The horizontal and vertical wire rods may form an opening for ingress and egress of the pet. The door may be fabricated from a plurality of horizontal and vertical wire rods. The door may be sufficiently large to cover the opening of the panel to prevent ingress and egress of the pet through the opening when the door is in a closed position and to allow ingress and egress of the pet through the opening when the door is in an opened position. The latch may be attached to the door or the panel for keeping the door in the closed position.

The latch may comprise a body pivotable about a pivot axis and biased toward an engaged position. The body may have a cage for keeping a locking wire rod of the panel or door when the latch is respectively attached to the door or panel. The body may have a camming surface for pivoting the body away from the engaged position so that the locking wire rod is guided into the cage.

The door may be vertically or horizontally traversable between the opened and closed positions.

The camming surface of the body of the latch may engage the locking wire rod of the panel or door to pivot the body and dispose the wire rod into the cage. The camming surface may be disposed distal to the cage with respect to a pivot axis of the body.

The latch may comprise a handle for pivoting the body from the engaged position to a disengaged position.

In another aspect, a method for opening and closing a door of a pet enclosure is disclosed. The method may comprise the steps of providing at least one panel having an opening for egress and ingress of a pet and a door sufficiently large to cover the opening of the panel to prevent the egress and ingress of the pet when the door is in a closed position; pivotally traversing a body of a latch mounted to the door or panel from an engaged position to a disengaged position to release a locking wire rod of the panel or door from a cage formed in the body of the latch; vertically traversing the panel to clear the locking wire rod from the cage of the latch; and after clearing the locking wire rod from the latch, rotating the door from the closed position to the opened position.

The pivotally traversing step may comprise the step of rotating a handle from a vertical position to a horizontal position about a handle pivot axis wherein an opposing end portion of the handle may be operative to push the body of the latch so as to pivot the body from the engaged position to the disengaged position.

In a different aspect, a pet enclosure for restraining a pet within an area is disclosed. The enclosure may comprise at least one panel, a door and a latch. The at least one panel may be fabricated from a plurality of horizontal and vertical wire rods. The horizontal and vertical wire rods may form an opening for ingress and egress of the pet. The door may be fabricated from a plurality of horizontal and vertical wire rods and traversable between closed and opened positions. The door may be sufficiently large to cover the opening to prevent ingress and egress of the pet through the opening when the door is in the closed position and to allow ingress and egress of the pet through the opening when the door is in the opened position. The latch may be attached to the door or the panel for keeping the door in the closed position.

The latch may comprise a handle and a catch which are rotatable between an engaged position and a disengaged position. The handle and catch may be biased and traversed to an offset position upon rotation of the catch to the disengaged position so that the catch does not interfere with traversal of the door between the closed and opened positions.

The enclosure may further comprise a compression spring disposed between the catch and a plate mounted to the door or panel to bias the handle and the catch to the offset position.

The enclosure may further comprise a rod connecting the handle and the catch. The rod may be traversable through a hole formed in a plate for mounting the latch to the door or panel.

The door may be vertically traversed when the door is traversed between the closed and opened positions.

In another aspect, a method for opening and closing a door of a pet enclosure is disclosed. The method may comprise the steps of providing at least one panel having an opening for egress and ingress of a pet and a door sufficiently large to cover the opening to prevent the egress and ingress of the pet when the door is in a closed position; rotating a catch to a disengaged position with a handle; and traversing the catch and the handle to an offset position when the catch is rotated to the disengaged position so that the catch does not interfere with traversal of the door between the opened and closed positions.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5A illustrates the latching mechanism of FIG. 2 being disengaged to permit traversal of the door to an opened position;

FIG. 5B is a cross-sectional side view of the disengaged latching mechanism of FIG. 5A;

FIG. 12A illustrates the latching mechanism shown in FIG. 9 being disengaged to permit traversal of the door to the opened position;

FIG. 12B is a cross-sectional side view of the disengaged latching mechanism of FIG. 12A;

FIG. 21A illustrates the door shown in FIG. 20B being traversed upward;

FIG. 21B is a side cross-sectional view of the door and latch mechanism shown in FIG. 21A;

FIG. 21C illustrates the door being traversed to the opened position;

FIG. 23A is a front view of the door and latching mechanism shown in FIG. 22A as the door is being traversed to the closed position;

FIG. 23B is a cross-sectional side view of the door and latching mechanism shown in FIG. 23A;

FIG. 24 is a perspective view of the pet crate with a fourth embodiment of the latching mechanism;

DETAILED DESCRIPTION

Figure 1:
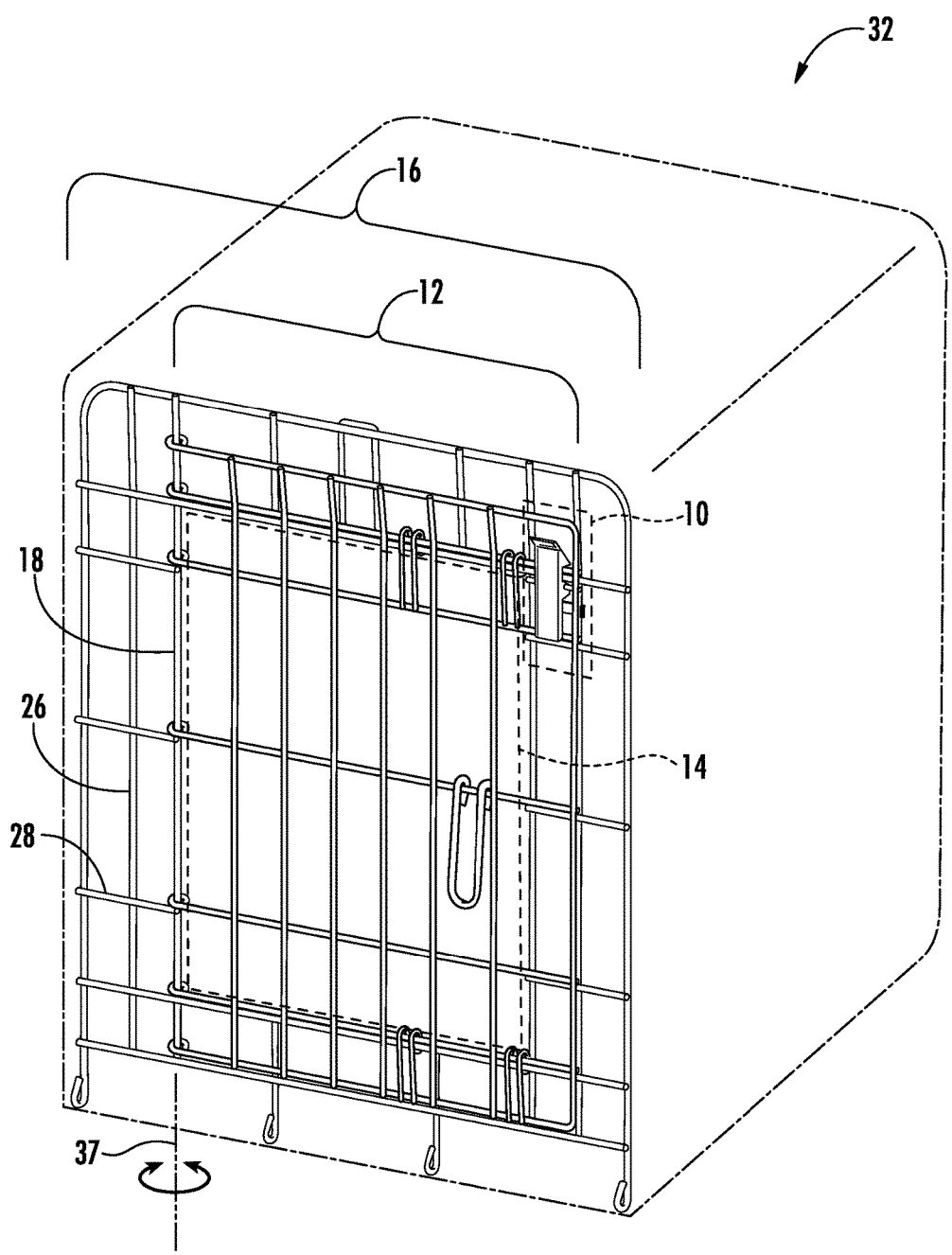
FIG. 1 is a perspective view of a pet crate having a door traversed to the closed position and a first embodiment of a latching mechanism.

Referring now to the drawings, latching mechanisms 10, 100, 200, 300, 400 are shown in FIGS. 1, 8, 16, 24 and 33. These latching mechanisms 10, 100, 200, 300, 400 are used to prevent opening of a door 12 to prevent ingress or egress through an opening 14 formed in a panel 16. The door 12 may be hinged to a vertical wire rod 18 of the panel 16 so that the door 12 may be rotatably traversed between an opened position and a closed position in a lateral or horizontal direction. Alternatively, as shown in FIG. 24, the door 312 may be hinged to a horizontal wire rod 318 so that the door 312 may be rotatably traversed between an opened position and a closed position in a vertical direction. Each of the latching mechanisms 10, 100, 200, 300, 400 do not interfere with operation of a lock 20 that requires the door 12 to be lifted in a vertical direction when traversing the door 12 between the opened and closed positions. Additionally, the latching mechanisms 10, 100, 200, 300, 400 do not interfere with operation or traversal of the door 12, 312 when being rotated between the opened and closed positions. Moreover, the latching mechanisms 10, 100, 200, 400 may have a camming surfaces 24, 124, 224, 424 that operates the latching mechanism 10, 100, 200, 400 without handler intervention when traversing the door 12 from the opened position to the closed position. Once the door 12 is in the closed position, the latching mechanisms 10, 100, 200, 300, 400 receive a wire rod 26, 28 of the respective panel 16 or door 12 so that the door 12 cannot be traversed up and down or traversed from the closed position to the opened position without handler intervention.

Figure 2:
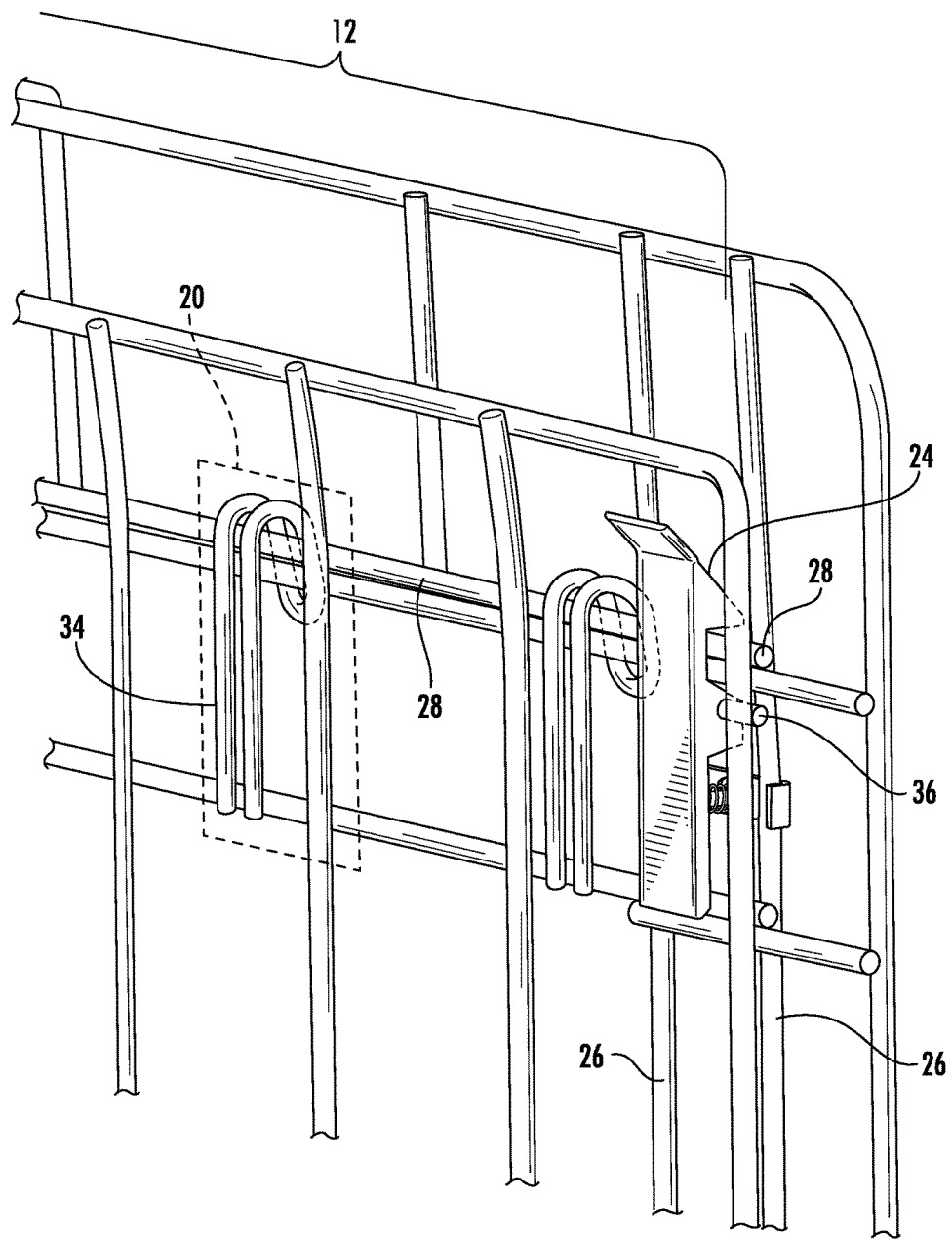
FIG. 2 is an enlarged perspective view of the latching mechanism shown in FIG. 1.
Figure 6B:
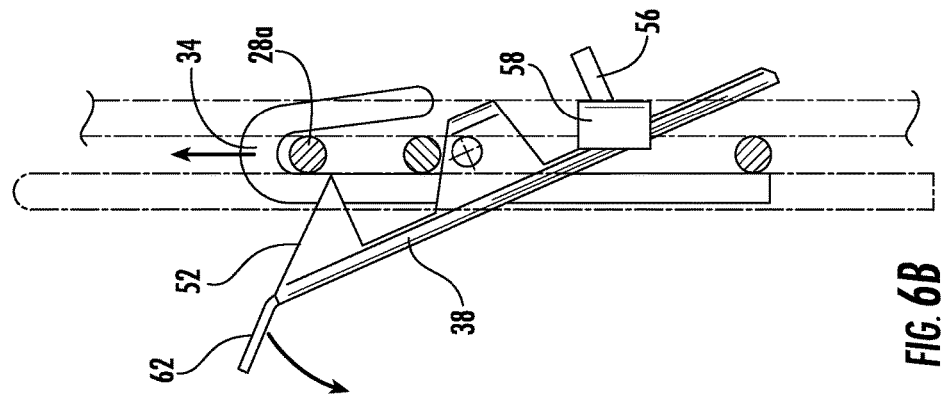
FIG. 6B is a cross-sectional side view of the door and latching mechanism shown in FIG. 6A.
Figure 6A:
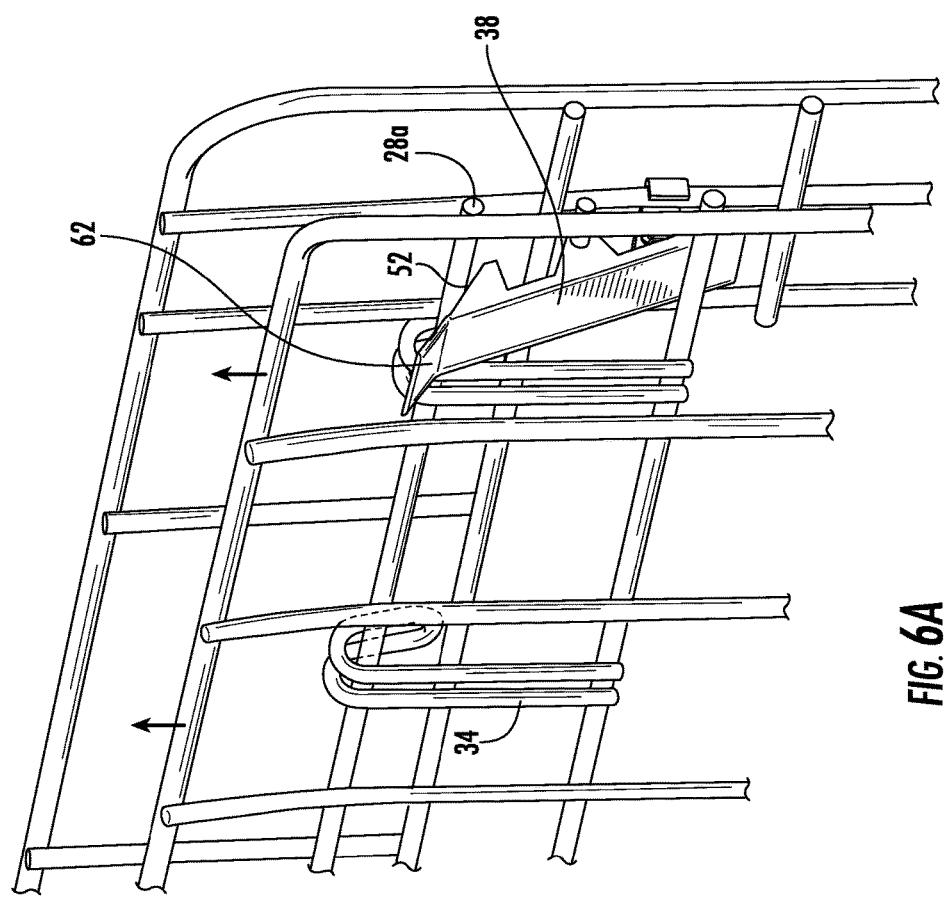
FIG. 6A illustrates the door and latching mechanism of FIG. 5A with the door in an up position.
Figure 7:
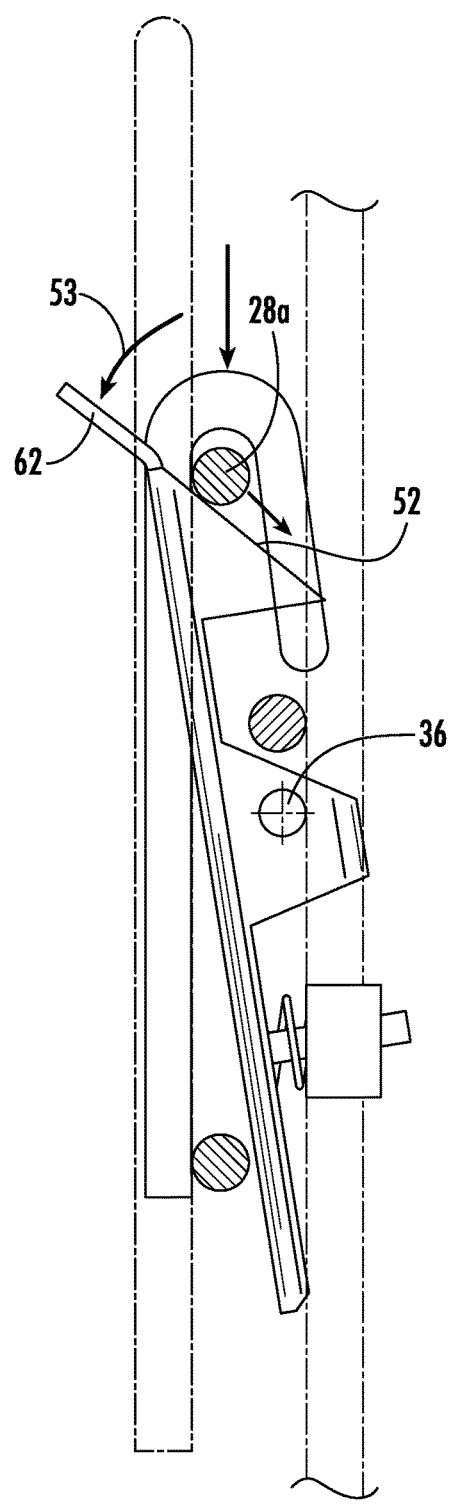
FIG. 7 is a cross-sectional side view of the door and latching mechanism shown in FIG. 6A with the latching mechanism being traversed to an engaged position.
Figure 8:
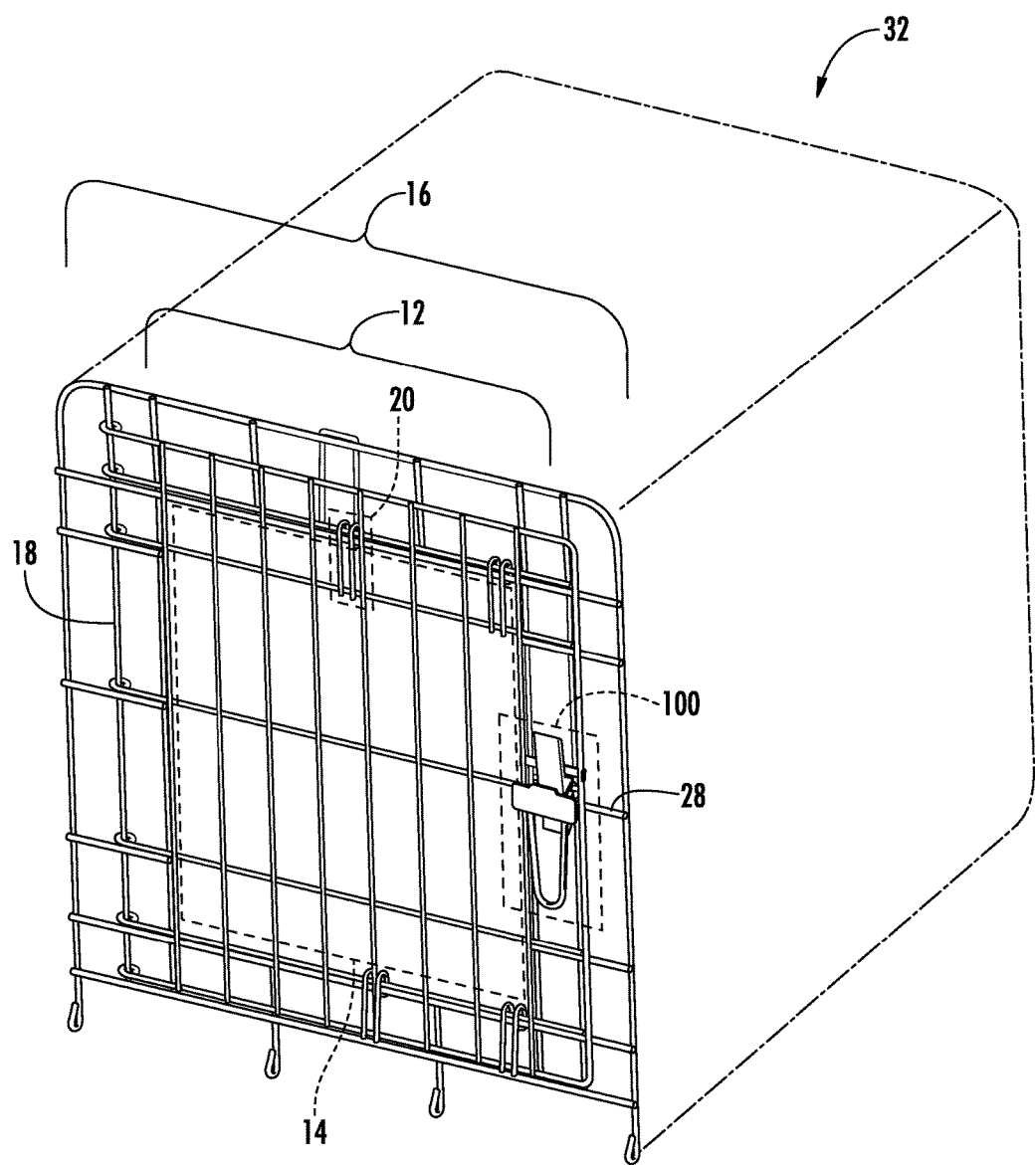
FIG. 8 is a perspective view of the pet crate having the door traversed to the closed position and a second embodiment of the latching mechanism.
Figure 25:
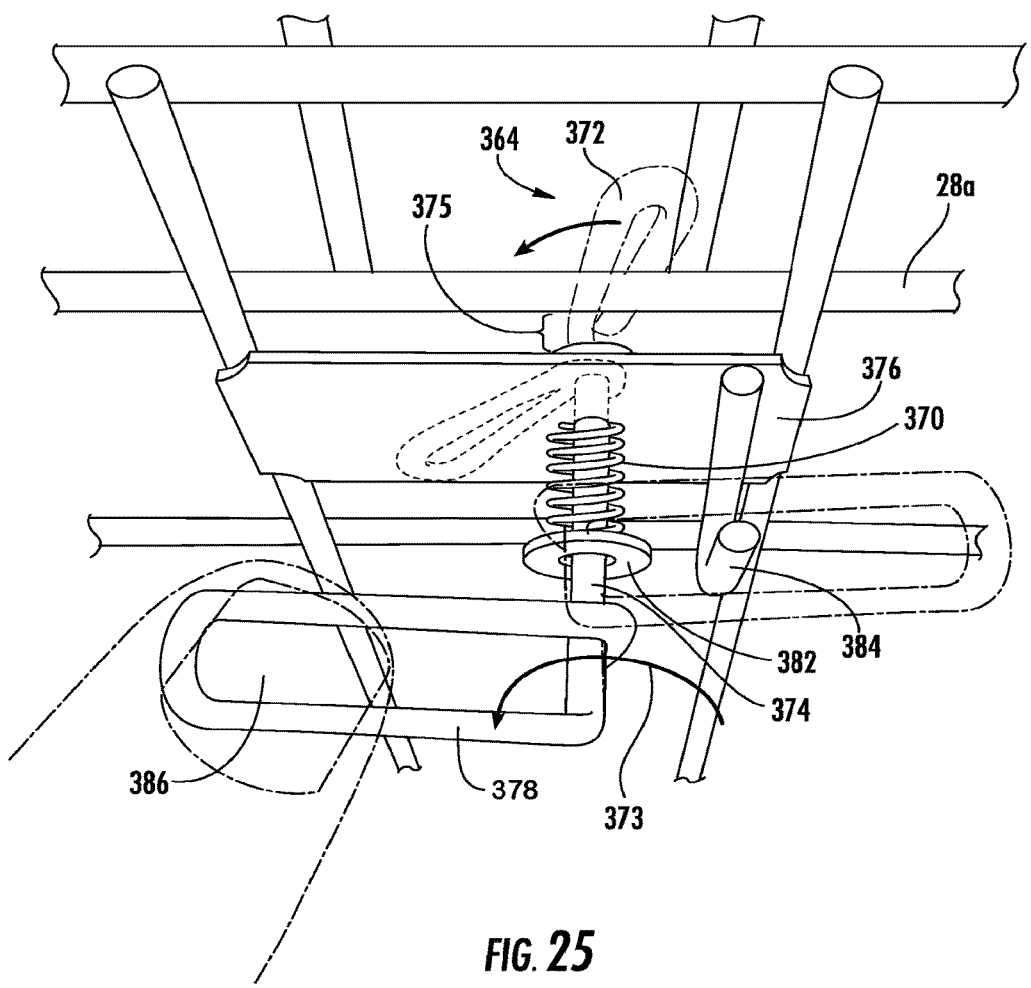
FIG. 25 is an enlarged perspective view of the latching mechanism shown in FIG. 24.

Referring now to FIGS. 1-7, and more particularly to FIGS. 1 and 2, a perspective view of the panel 16 and door 12 fabricated from a plurality of vertical and horizontal wire rods 26, 28 is shown. The door 12 may be hinged to the panel 16 about a vertical wire rod 18 of the panel 16. A plurality of horizontal wire rods 28 of the door 12 may be bent around the vertical wire rod 18 of the panel 16. The horizontal and vertical wire rods 26, 28 define an opening 14 of the panel 16 through which a pet may enter or exit a pet crate 32. The door 12 is shown as being rotatable about the vertical wire rod 18 of the panel 16 so that the door 12 may be rotated to the left. However, it is also contemplated that the door 12 may be hinged to a vertical wire rod 18 on the other side of the opening 14 so that the door 12 may be rotated to the right. The various aspects and features disclosed herein may be modified in the reverse direction in order to accommodate the right swinging door 12. Additionally, the vertical wire rod 18 of the panel 16 which defines the pivot axis of the door 12 is shown as defining an interior periphery of the opening 14. However, it is also contemplated that the vertical wire rod 18 about which the door 12 rotates or is hinged to may be offset outward from the opening 14 as shown in FIG. 8. Additionally, in an alternative embodiment, it is also contemplated that the door 312 may be traversed upward about a horizontal wire rod 28 as shown in FIG. 25.

The door 12 is traversable between a closed position and an opened position. In the closed position, the door 12 may have a lock 20 (see FIG. 2) in the form of a plurality of hooks 34 that are hooked over one or more horizontal wire rods 28 of the door 12. The locks 20 are locked when the hooks 34 are engaged to the wire rod(s) 28. The locks 20 are unlocked when the hooks 34 are disengaged from the wire rod(s) 28. When the pet attempts to push the door 12 open, the hooks 34 prevent the door 12 from rotating to the opened position. However, some pets may be capable of lifting the door 12 so that the hooks 34 clear the respective horizontal wire rods 28 to rotate the door 12 to the opened position. The operation of the hooks 34 is described in U.S. patent application Ser. No. 13/045,035, the entire contents of which are expressly incorporated herein by reference. Although the door 12, 312 is shown as incorporating hooks 34, it is also contemplated that the latching mechanisms 10, 100, 200, 300, 400 may also be used in conjunction with other structures such as inverted hooks, up-right clips, inverted tabs and up-right tabs as described in U.S. patent application Ser. No. 13/045, 035.

Figure 3:
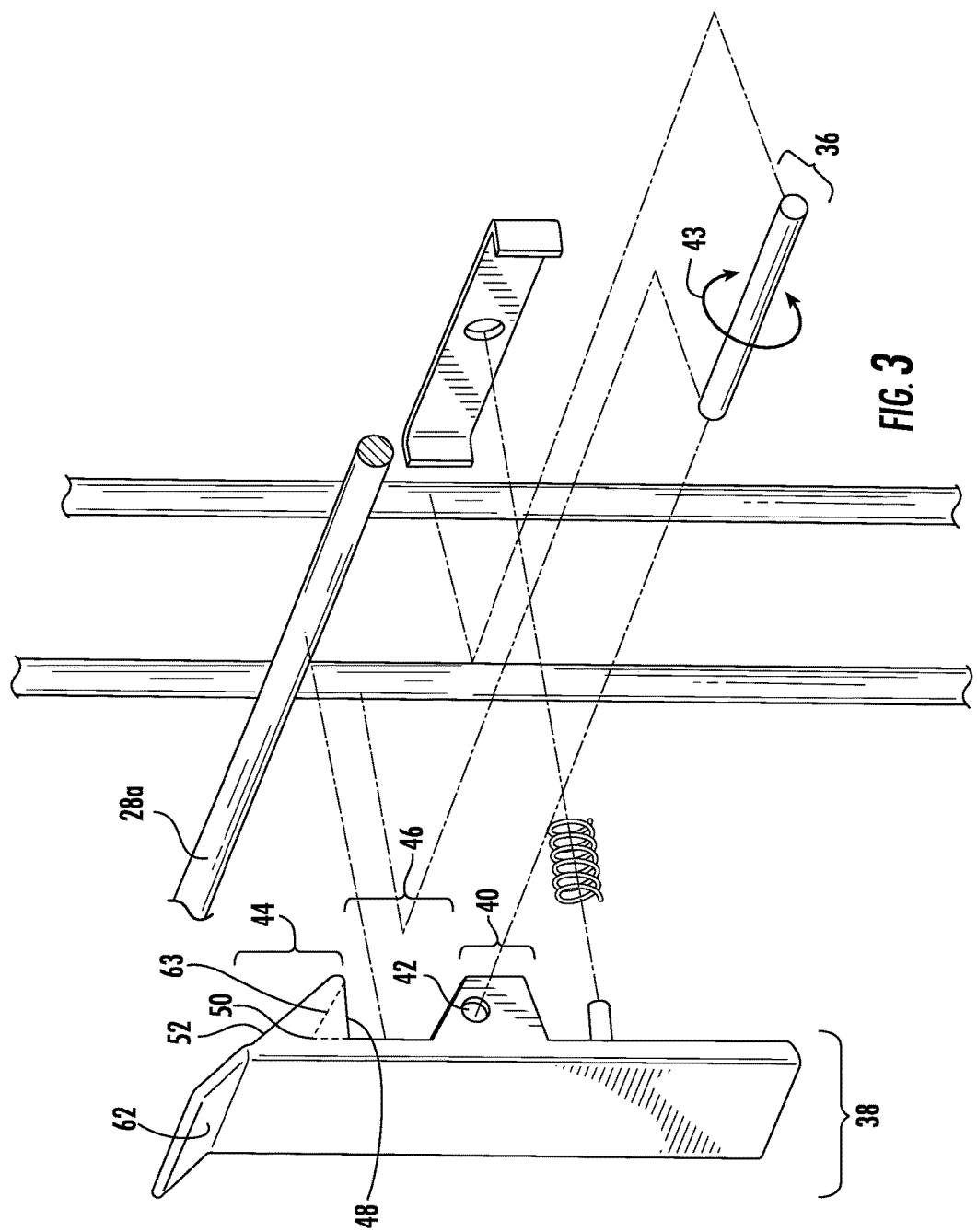
FIG. 3 is an exploded perspective view of the latching mechanism shown in FIG. 2.

Referring now to FIGS. 1-7, and more particularly to FIG. 2, a first embodiment of a latching mechanism 10 is shown which prevents the animal from being able to lift the door 12 upward so that the hooks 34 cannot clear the horizontal wire rods 28 of the panel 16. The latching mechanism 10 may be mounted to the panel 16. In particular, the latching mechanism 10 may have a pivot pin 36 which is welded to two adjacent vertical wire rods 26 of the panel 16. The pivot pin 36 is preferably in a horizontal configuration and generally perpendicular to the rotational axis 37 (see FIG. 1) of the door 12 about the vertical wire rod 18 of the panel 16. As shown in FIG. 3, the latching mechanism 10 may further include a body 38 that has lower flanges 40 on both sides that extend away and toward the pivot pin 36. The lower flanges 40 may have apertures 42 through which the pivot pin 36 resides. In this manner, the body 38 of the latching mechanism 10 pivots about the pivot pin 36, and thus, the pivot pin 36 defines a pivot axis 43 of the body 38 of the latching mechanism 10.

The body 38 of the latching mechanism 10 may further include upper flanges 44. These upper flanges 44 extend toward the interior of the pet crate 32 and form a cage 46 in which a horizontal wire rod 28a of the door 12 is trapped to prevent the door 12 from being vertically traversed upward. The upper flanges 44 may have lower surfaces 48 which defines the cage 46 and is generally perpendicular to a direction of the upward traversal of the door 12. It is also contemplated that the lower surfaces 48 of the upper flanges 44 of the body 38 may be slanted downwards (see dashed lines in FIG. 3) so that the horizontal wire rod 28 is jammed into corner 50 when the door 12 is traversed upward without traversing the body 38 of the latching mechanism 10 to a released position.

The upper surfaces 52 of the upper flanges 44 may act as a camming surfaces to aid in the capture of the horizontal wire rod 28a of the door 12 when the door 12 is traversed from the opened position to the closed position. In particular, in closing the door 12, the door 12 is initially raised upward and aligned to the panel 16. At this point, the horizontal wire rod 28a of the door 12 which will be trapped within the cage 46 is disposed immediately above the upper surfaces 52 of the upper flanges 44, as shown in FIG. 7. When the door 12 is dropped, the horizontal wire rod 28a of the door 12 contacts the upper surfaces 52 and due to the angled nature of the upper surfaces 52 of the upper flanges 44, the horizontal wire rod 28a of the door 12 pushes the body 38 outward in the direction of arrow 53 and pivots the body 38 about the pivot pin 36. The horizontal wire rod 28a of the door 12 is now disposed below the upper flanges 44 and the body 38 is traversed to the engaged position as shown in FIG. 4.

Referring back to FIG. 3, the body 38 of the latching mechanism 10 may be biased to the engaged position with a spring 54 so that the body 38 is traversed back to the engaged position once the horizontal wire rod 18 of the door 12 is disposed below the upper flanges 44. In particular, the spring 54 may be disposed below the pivot pin 36. The spring 54 is disposed about and guided by a guide rod 56 that is attached to a lower half of the body 38. A guide plate 58 with an aperture 60 may be attached (e.g., welded) to the vertical wire rods 26 of the panel 16. The guide rod 56 may proceed through the aperture 60 of the guide plate 58 as shown in FIG. 5B. The spring 64 is disposed between the lower half of the body 38 and the guide plate 58. When the body 38 is pivoted toward the released position (see FIG. 5B), the spring 54 compresses between the body 38 and the guide plate 58. When finger pressure is released from the upper half of the body 36, the spring 54 pushes the lower half of the body 38 to push the body 38 back toward the engaged position (see FIG. 4). As shown in FIG. 7, the body 38 may be traversed toward the released position during the closing procedure under the force of the horizontal wire rod 28a of the door 12 that contacts the upper surfaces 52 or during the opening procedure under the force of the handler's finger pulling back on the tab 62 that extends the upper surfaces 52 of the upper flanges 44, as discussed further below and shown in FIG. 5B.

In operation, the latching mechanism 10 prevents upward traversal of the door 12 when the door 12 is in the closed position, as shown in FIG. 2. The pet cannot escape out of the pet crate 32 because complex motor skills above the capabilities of the pet are required to open the door 12 (i.e., the latching mechanism 10 must be traversed to the released position and the door 12 lifted up). From the closed position, in order to open the door 12, the handler pulls back on the body 38 in order to traverse the body 38 from the engaged position to the released position as shown in FIGS. 5A and 5B. To facilitate such motion, a tab 62 is attached to the body 38 aligned to the upper surfaces 52 so as to form an extension thereof 52 and to provide further extension for use by the handler's finger. The handler may use his or her index finger of one hand in order to pull back on the tab 62 in the direction of arrow 65. With the body 38 in the released position (see FIGS. 5A and 5B), the horizontal wire rod 28a of the door 12 is not trapped within the cage 46 below the upper flanges 44. The handler may now use his or her other hand to lift the door 12 upward so that the horizontal wire rod 28a of the door 12 trapped within the cage 46 can be raised above the upper flanges 44 of the body 38, as shown in FIGS. 6A and 6B. Additionally, the hooks 34 are unhooked from the horizontal wire rod 28 of the panel 16 to allow the door 12 to be rotated to the opened position.

Figure 4:
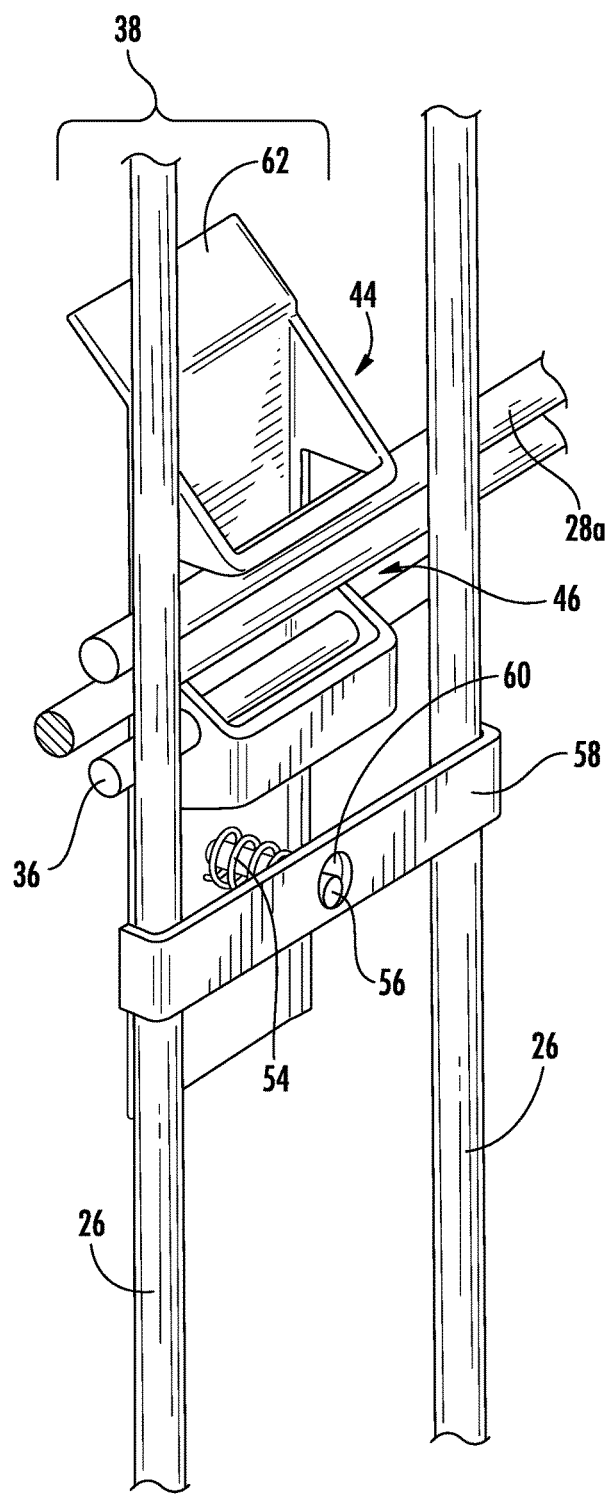
FIG. 4 is a rear perspective view of the latching mechanism shown in FIG. 2.

When the body 38 is in the engaged position and the horizontal wirerod 28a is trapped in the cage 46, the upper flanges 44 of the body 38 are disposed immediately above the horizontal wire rod 28a, as shown in FIG. 4. When the door 12 is lifted upward, the horizontal wire rod 28a contacts the lower surfaces 48 of the upper flanges 44. Since the lower surfaces 48 are in a horizontal configuration with respect to the upward direction of the door 12, the upward force that the horizontal wire rod 28a applies to the upper flanges 44 of the body 38 cannot pivot the body 38 to the released position. Moreover, the horizontal wire rod 28a that is trapped within the cage 46 of the body 38 is preferably disposed immediately above the pivot pin 36. As such, the upward force caused by the horizontal wire rod 28a on the upper flanges 44 is equally counteracted by the downward force caused by the pivot pin 36. The vertical alignment between the horizontal wire rod 28a trapped within the cage 46 and the pivot pin 36 prevent any rotation of the body 38 when the door 12 is lifted upward when the latching mechanism 10 is in the engaged position. Moreover, the lower surfaces 48 of the upper flanges 44 may alternatively be tilted downward (see dash line 63 in FIG. 3) so that the horizontal wire rod 28a trapped within the cage 46 is further wedged toward the corner 50 when the body 38 is in the engaged position and the door 12 is lifted up. Only by traversing the body 38 to the released position (see FIGS. 5A and 5B) is the horizontal wire rod 28a allowed to escape out of the cage 46 of the body 38.

With the door 12 lifted upward and the horizontal wire rod 28a out of the cage 46 of the body 38 of the latching mechanism 10, the handler may now rotate the door 12 about the vertical wire rod 18 to traverse the door 12 to the opened position.

From the opened position, the handler may now close the door 12 with one hand. The handler merely lifts the door 12 upward so that the horizontal wire rod 28a clears the upper edge of the tab 62 of the body 38. The door 12 is rotated so that the door 12 covers the opening 14 of the panel 16 and is generally parallel with the panel 16. At this point, the horizontal wire rod 28a is disposed immediately above the upper flanges 44 of the body 38. The body 38 is also in the engaged position. The handler releases the door 12 to allow the door to fall downward as shown in FIG. 7. As the door 12 is traversed downward, the horizontal wire rod 28a contacts the upper surfaces 52. Since the upper surfaces 52 are angled, the horizontal wire rod 28a pushes the upper half of the body 38 outward and rotates the body 38 about the pivot pin 36. If the horizontal wire rod 28a is not perfectly disposed above the upper surfaces 48 of the upper flanges 44, the horizontal wire rod 28a catches the tab 62 which guides the horizontal wire rod 28a onto the upper surfaces 52 of the upper flanges 44. This action also pivots the body 38 about the pivot pin 36 toward the released position. The horizontal wire rod 28a of the door 12 enters the cage 46. The body 38 is pivoted back to the engaged position by way of the spring 54. At this point, the door 12 cannot be lifted upward by the pet.

Referring now to FIGS. 8-15, a second embodiment of the latching mechanism 100 is shown. The latching mechanism 100 is similar to the latching mechanism 10 shown in FIGS. 1-7. However, the latching mechanism 100 is mounted to the door 12 instead of the panel 16. Also, instead of a two-handed operation to open the door 12 as discussed in relation to FIGS. 1-6, the latching mechanism 100 and the door 12 can be opened with one hand.

Figure 9:
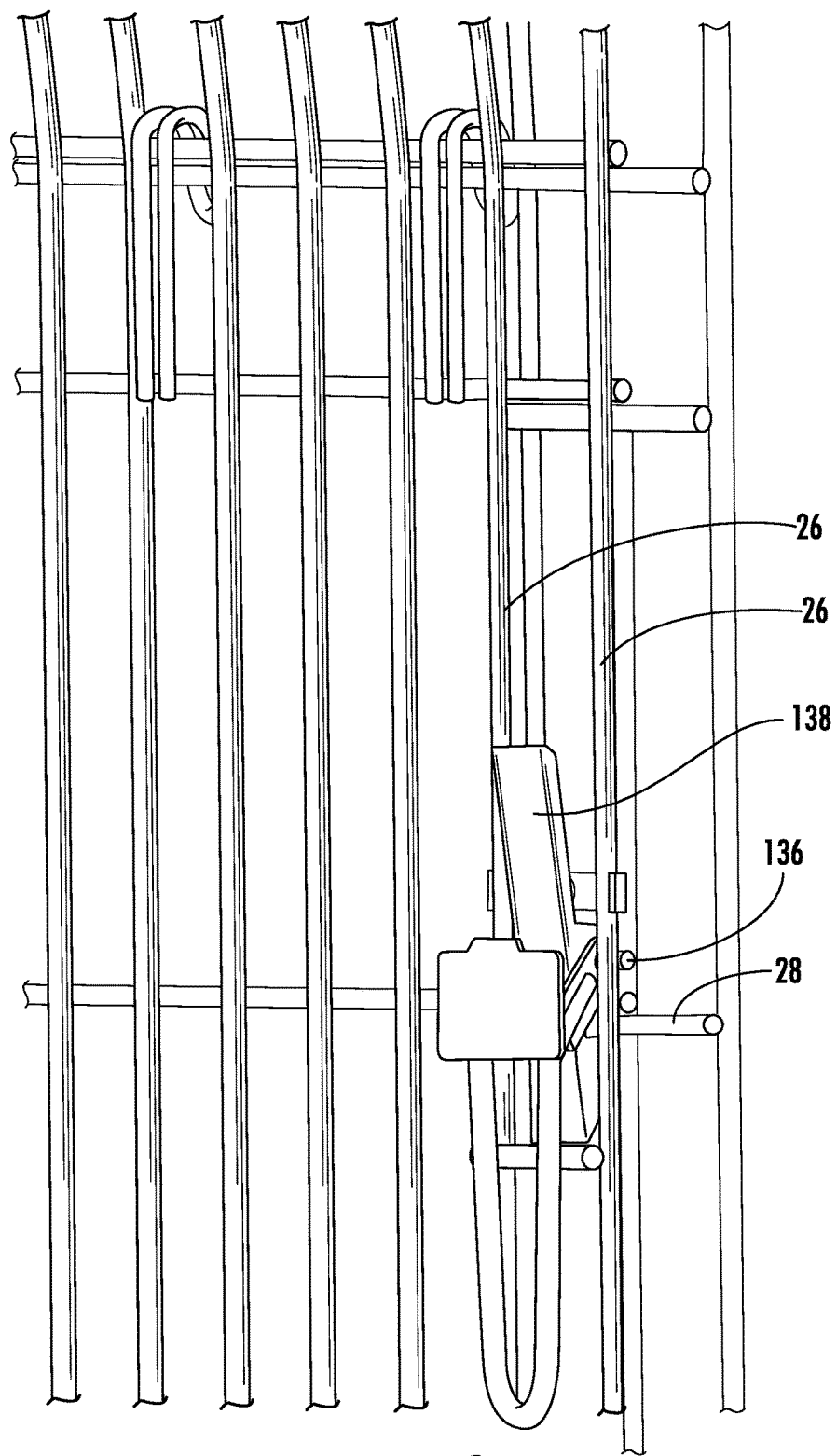
FIG. 9 is an enlarged perspective view of the latching mechanism shown in FIG. 8.
Figure 10:
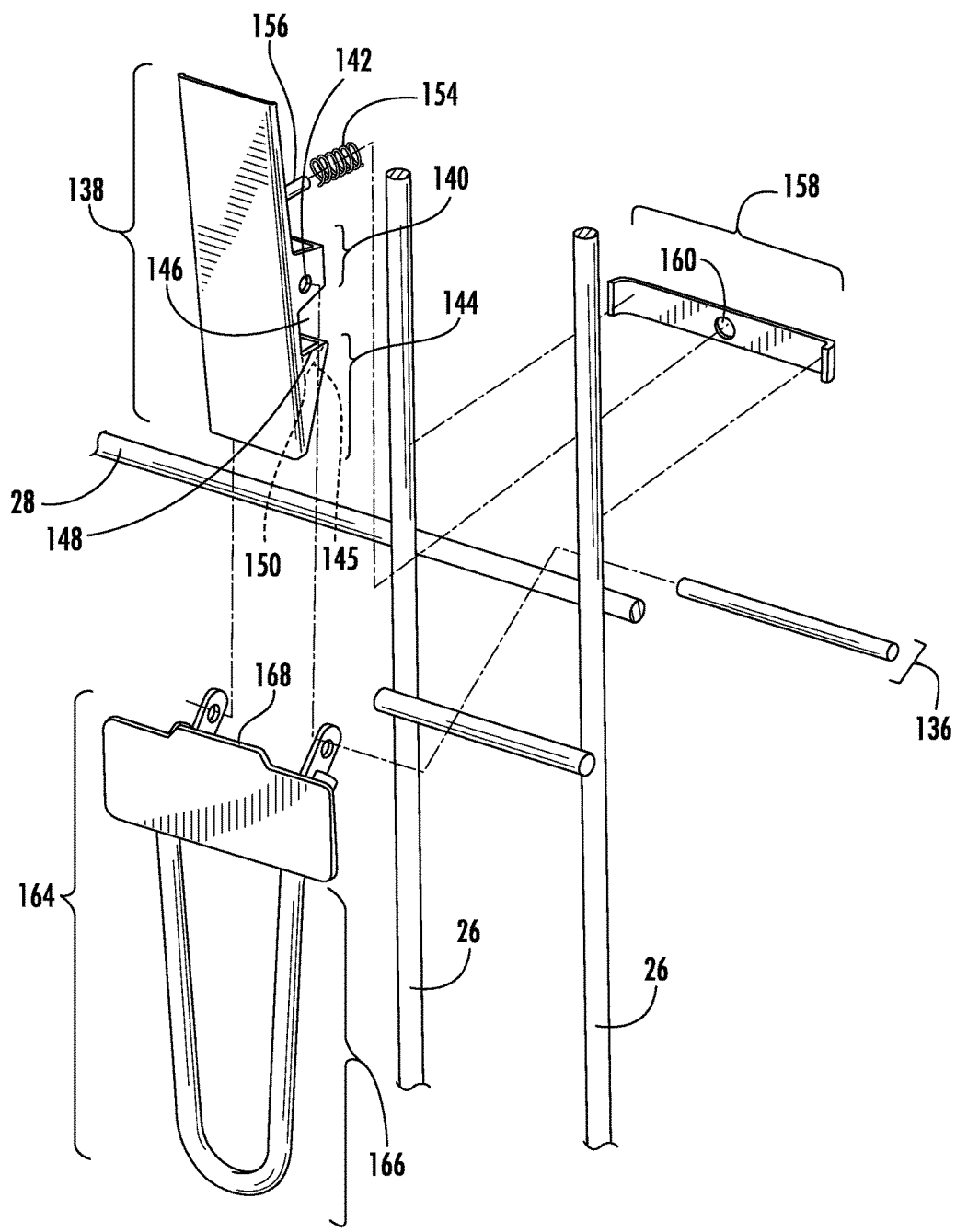
FIG. 10 is an exploded perspective view of the latching mechanism shown in FIG. 9.

Referring now to FIGS. 9 and 10, the latching mechanism 100 may have a body 138 that pivots about pivot pin 136. Pivot pin 136 is attached to the vertical wire rods 26 of the door 12 in a horizontal orientation with respect to the upward traversal of the door 12. In other words, the pivot pin 36 is oriented so as to be perpendicular to the pivot axis 37 defined by the vertical wire rod 18 of the panel 16. The body 138 of the latching mechanism 100 may have flanges 140 that extend toward the interior of the crate 32. The flanges 140 may have apertures 142 through which the pivot pin 136 resides. As such, the pivot pin 136 defines a rotational axis of the body 138 between the released and engaged position. The body 138 may be biased toward the engaged position with the spring 154. The spring 154 is disposed between the body 138 and a guide plate 158. The guide plate 158 is attached to the vertical wire rods 26 of the door 12 and has an aperture 160 that receives a guide rod 156. The guide rod 156 is attached behind the body 138 and holds the spring 154 in place. The spring 154 is disposed about the guide rod 56 between the body 138 and the guide plate 58. As such, the spring pushes the body 138 so as to bias the body 138 towards the engaged position.

Figure 11:
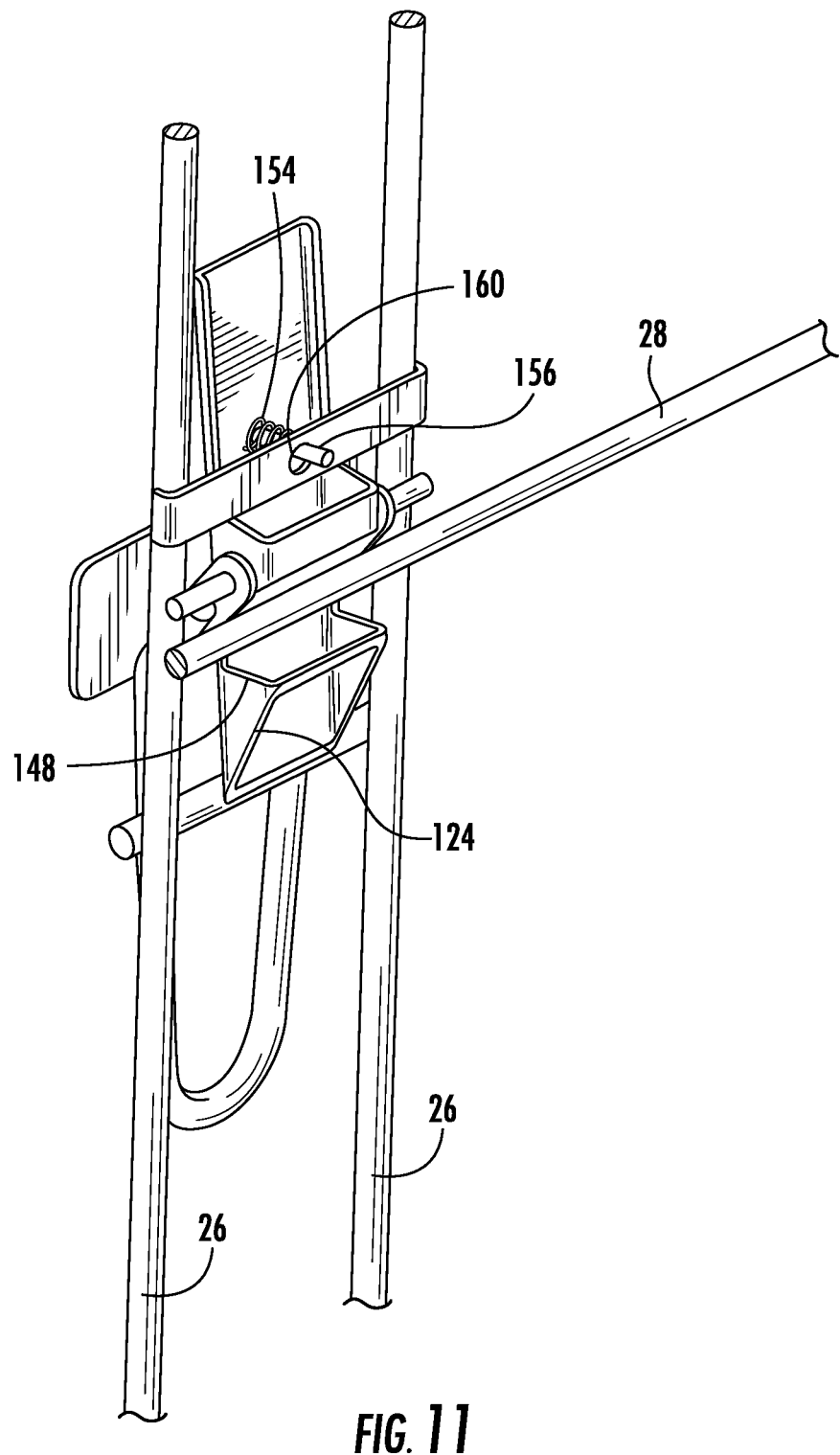
FIG. 11 is a rear perspective view of the latching mechanism shown in FIG. 9.

The body 138 may additionally have flanges 144 that also protrude in toward the interior pet crate 32. The flanges 144 define upper surfaces 148, as shown in FIGS. 10 and 11. The upper surfaces 148 form a cage 146 in which a horizontal wire rod 28a of the panel 16 is trapped to prevent upward traversal of the door 12 when in the closed position. The upper surfaces 148 are preferably perpendicular to the upper traversal of the door 12 or in other words, perpendicular to the pivot axis of the door 12 defined by the vertical wire rod 18 of the panel 16. In this manner, when the door 12 is lifted up with the latching mechanism 100 in the engaged position, the horizontal wire rod 28a of panel 16 does not create a force on the body 138 so as to traverse or pivot the body 138 toward the released position. The upper surfaces 148 of the flanges 144 may also be angled (see dash lines 145 in FIG. 10) so as to force the horizontal wire rod 28a of the panel 16 into the corner 150 when the pet attempts to lift the door 12 while the latching mechanism 100 is in the engaged position.

Figures 13A, 13B:
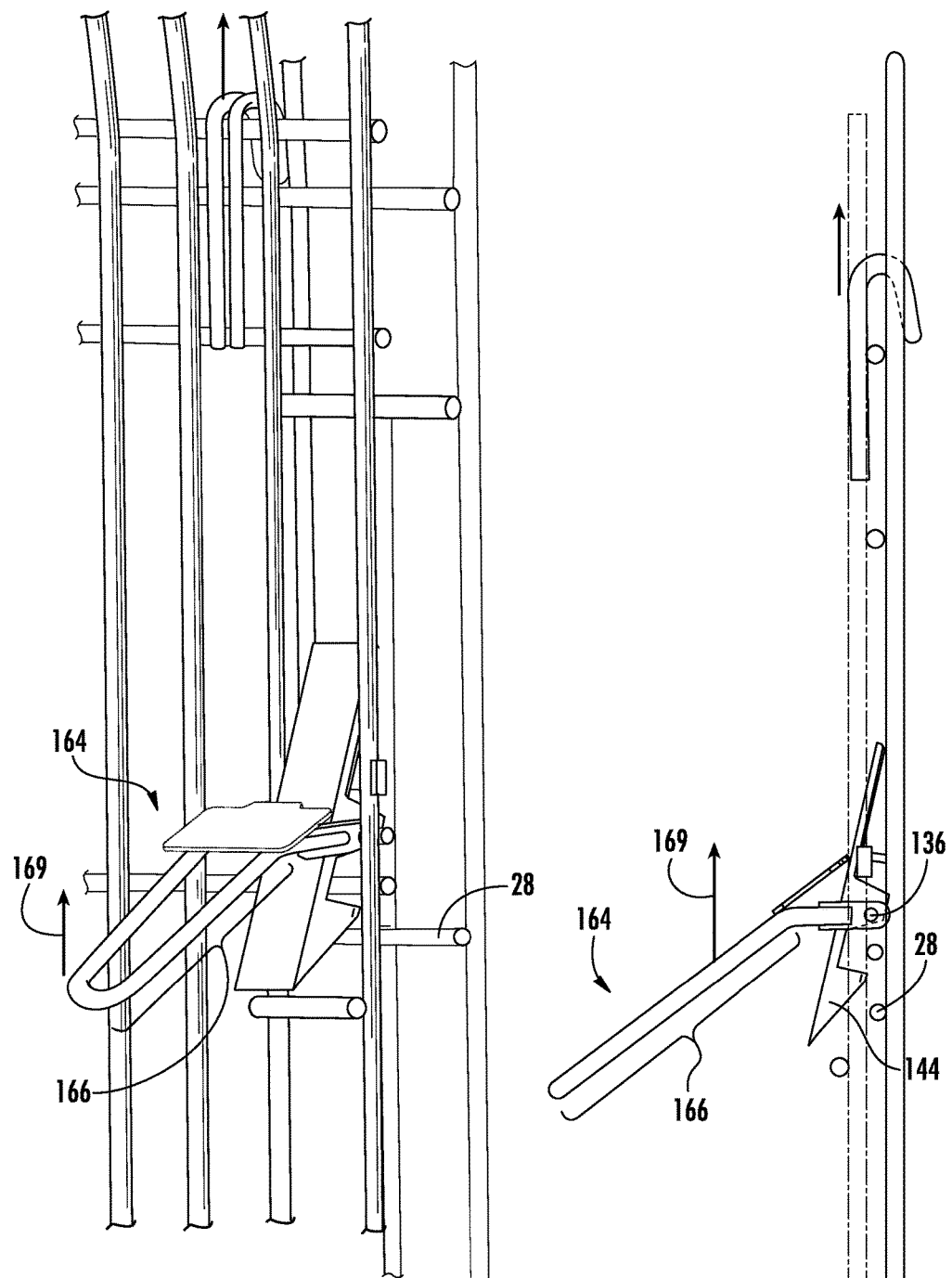
FIG. 13A illustrates the door and latching mechanism shown in FIG. 12A with the door in an up position.
FIG. 13B is a cross-sectional side view of the door and latching mechanism shown in FIG. 13A.
Figure 14A:
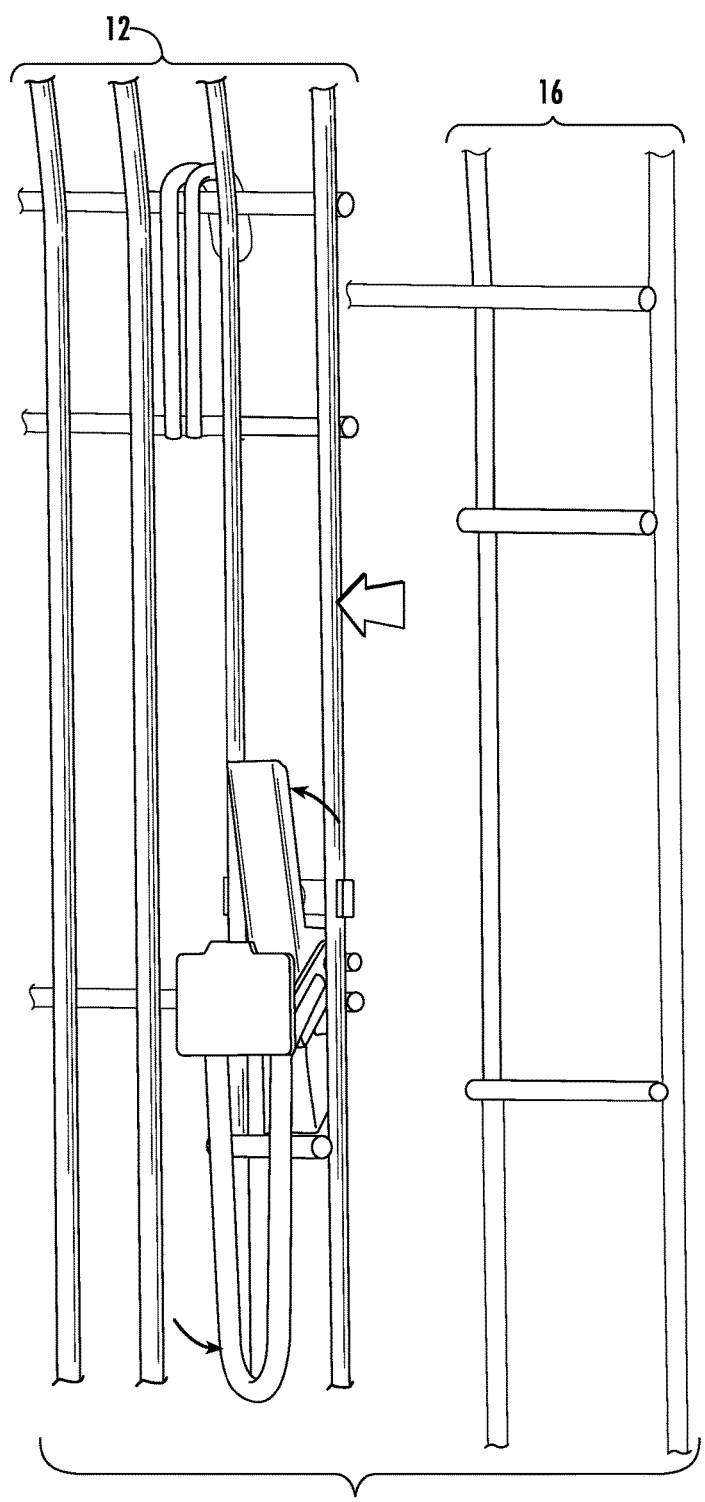
FIG. 14A is a perspective view of the door and latching mechanism with the door being traversed to an opened position.
Figure 14B:
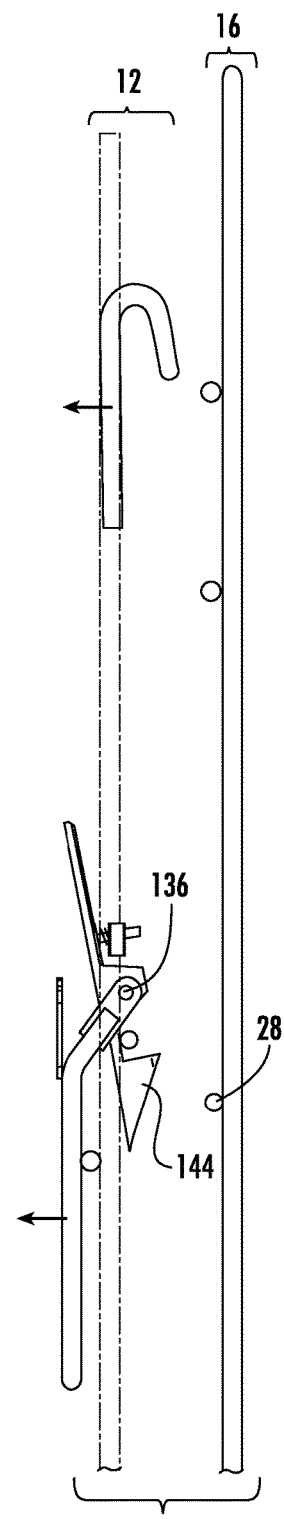
FIG. 14B is a cross-sectional side view of the door and latching mechanism shown in FIG. 14A.
Figure 15:
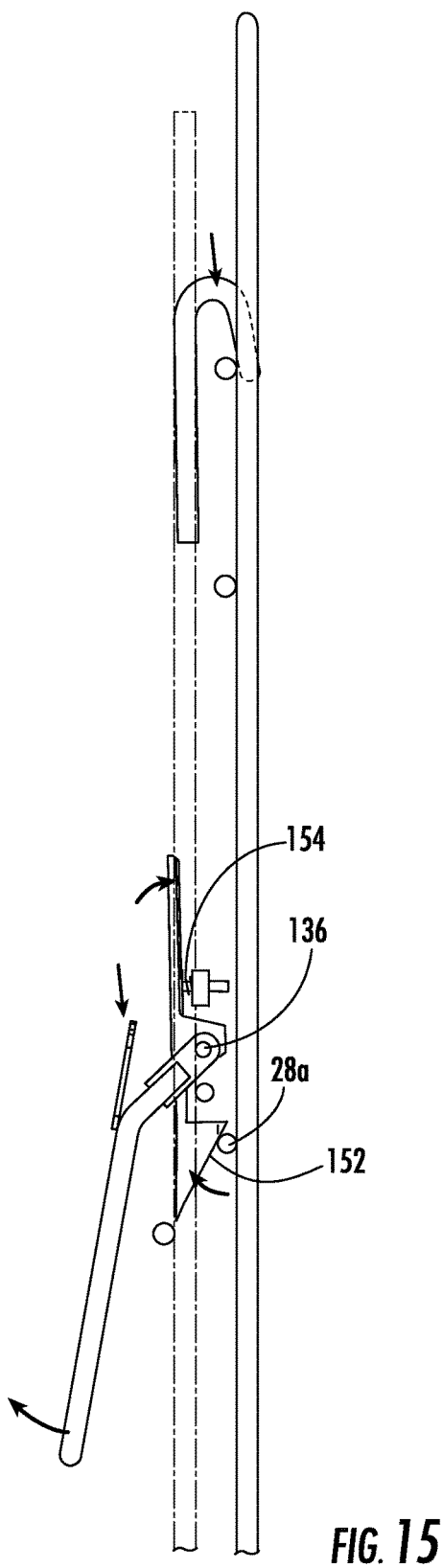
FIG. 15 is a cross-sectional side view of the door and latching mechanism shown in FIG. 11 with the latching mechanism being traversed to the engaged position.
Figure 16:
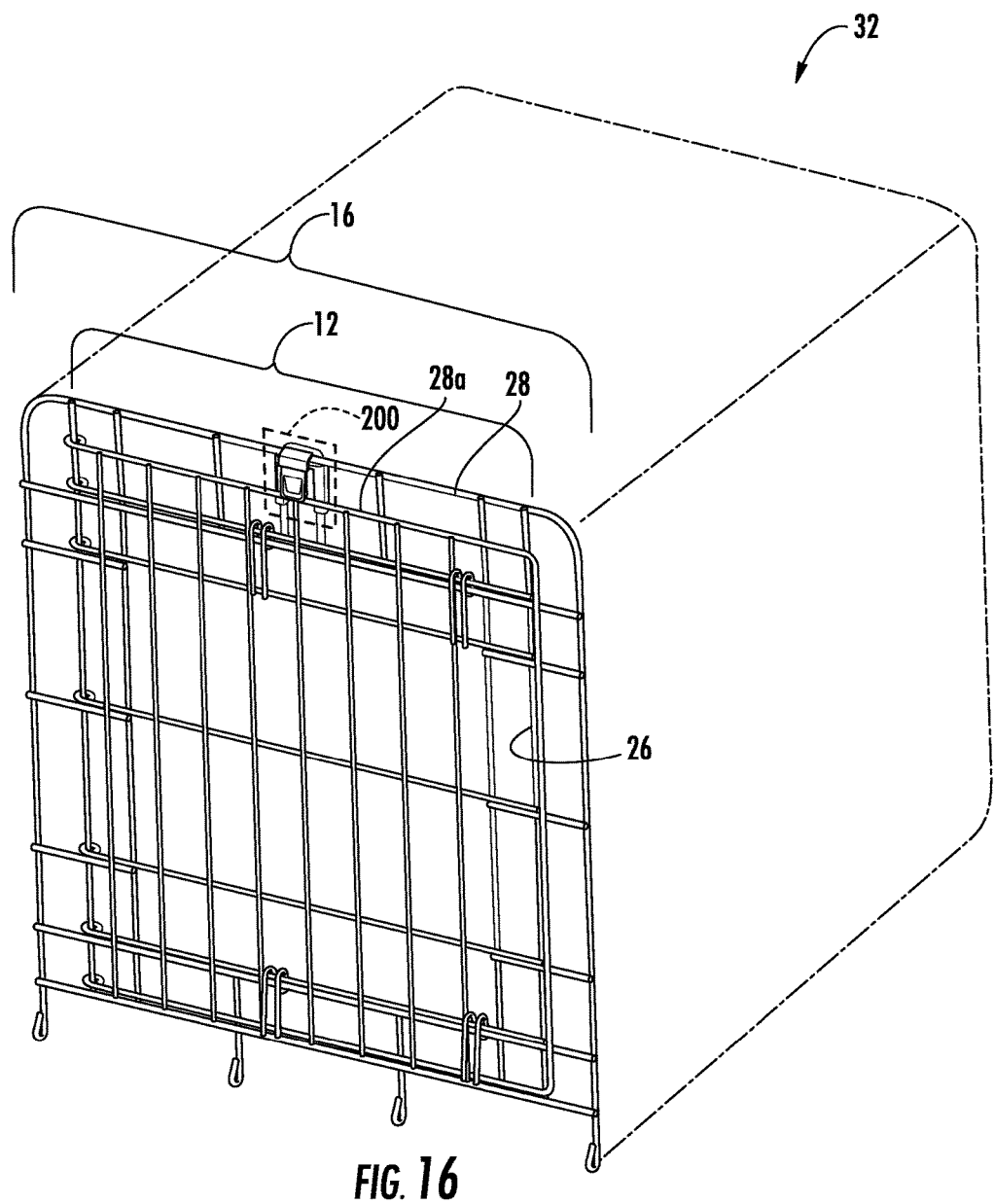
FIG. 16 is a perspective view of the pet crate having the door traversed to the closed position and a third embodiment of the latching mechanism.

The latching mechanism 10 may additionally have a handle 164 that is pivotally mounted to the pivot pin 136. The handle 164 has a gripping portion 166 that can be traversed upward in the direction of arrow 167 (See FIGS. 12A and 12B) to traverse the body 138 from the engaged position to the released position. When the gripping portion 166 of the handle 164 is traversed upward, an opposed end 168 contacts the body 138 above the pivot pin 136. The opposed end 168 pushes the body 138 so as to rotate the body 138 from the engaged position to the released position. The handler grips the gripping portion 166 and rotates the gripping portion 156 upward. Once the flanges 144 clear the horizontal wire rod 28a of the panel 16, as shown in FIGS. 13A and 13B, the handler may now lift upward in the direction of arrow 169 on the gripping portion 166 in order to lift the door 12 upward. Since the horizontal wire rod 28a clears the flanges 144, the door 12 can be lifted upward so that the horizontal wire rod 28a escapes out of the cage 146 of the body 138. The door 12 may now be rotated about the vertical wire rod 18 of the panel 16 to traverse the door 12 to the opened position, as shown in FIGS. 14A and 14B.

From the opened position in order to close the door 12, the handler need not manipulate the latching mechanism 100. Instead, the handler may grab the door 12 by any one of the horizontal wire rods 28a. The handler lifts the door 12 upward so that the flanges 144 clear the horizontal wire rod 28a of the panel which will be trapped in the cage 146 of the body 138. The handler then rotates the door 12 to cover the opening 14 of the panel 16. In this position, the door 12 is parallel with the panel 16 and the latching mechanism 100 is generally above the horizontal wire rod 28a that will be trapped in the cage 146 of the body 138 of the latching mechanism 100. The handler need only drop or release the door 12 and the horizontal wire rod 28a of the panel 16 will automatically be inserted into the cage 146 of the latching mechanism 100 without any further handler intervention.

More particularly, when the handler releases the door 12, gravity traverses the door 12 downward. On this downward traversal, the horizontal wire rod 28a of the panel 16 contacts lower surfaces 152 of the flanges 144. The lower surfaces 152 act as camming surfaces in order to push the body 138 so that the body 138 pivots about the pivot pin 136 toward the released position. More particularly, the lower surfaces 152 are angled so that the horizontal wire rod 28a of the panel 16 generates a force in order to pivot the body 138 about pivot pin 136. Once the horizontal wire rod 28a of the panel 16 clears the flanges 144, the spring 154 pushes the body 138 back towards the engaged position. At this point, the door 12 cannot be lifted upward by the pet that may be placed in the crate 32.

Referring now to FIGS. 16-23, a third embodiment of the latching mechanism 200 is shown. The latching mechanism 200 is secured to horizontal and/or vertical wire rods 26, 28 of the panel 16. When the door 12 is in the closed position, a tab 202 of the latching mechanism 200 is disposed over a horizontal wire rod 28a of the door 12 so that the door 12 cannot be lifted up in order to unlock the locks 20. The tab 202 holds the door 12 in the closed position.

Figure 17:
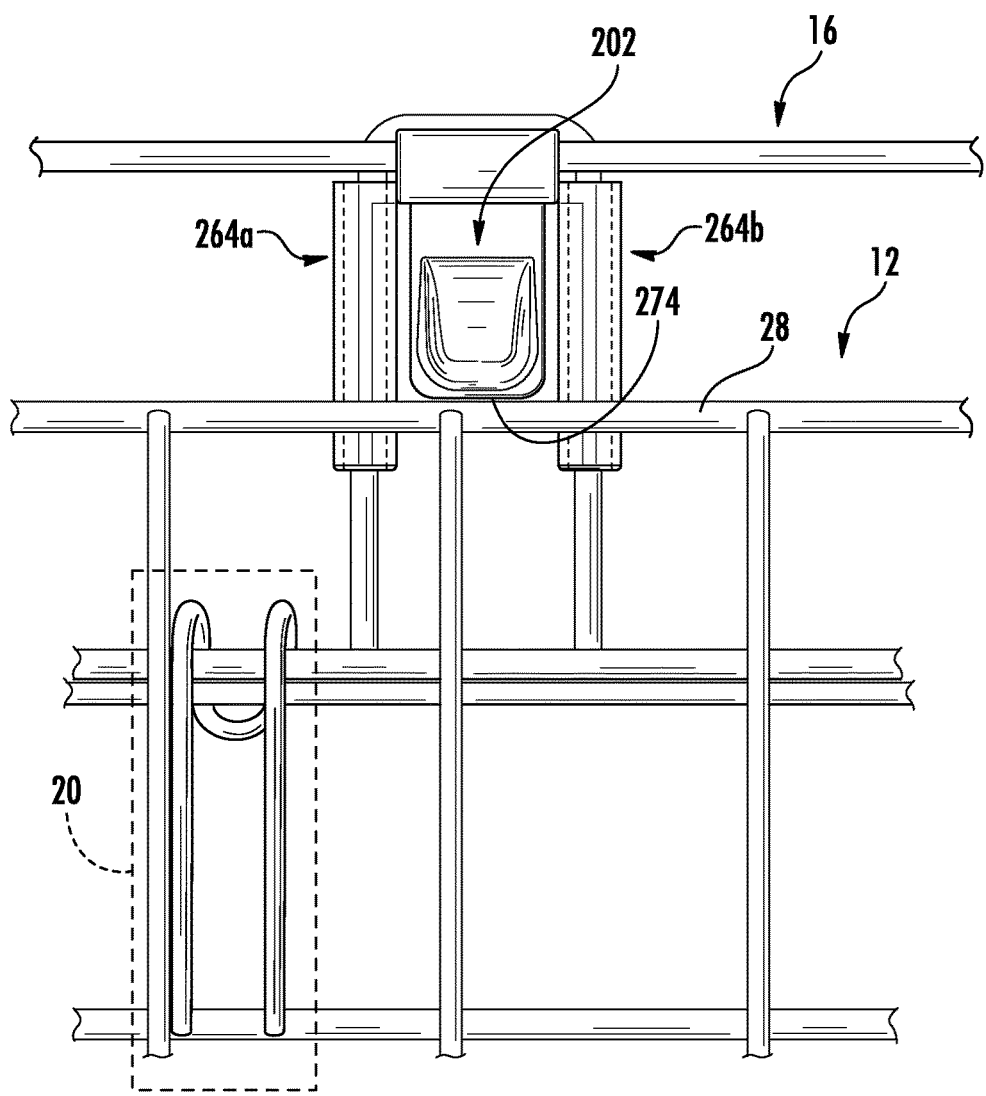
FIG. 17 is an enlarged front view of the latching mechanism shown in FIG. 16.
Figure 18:
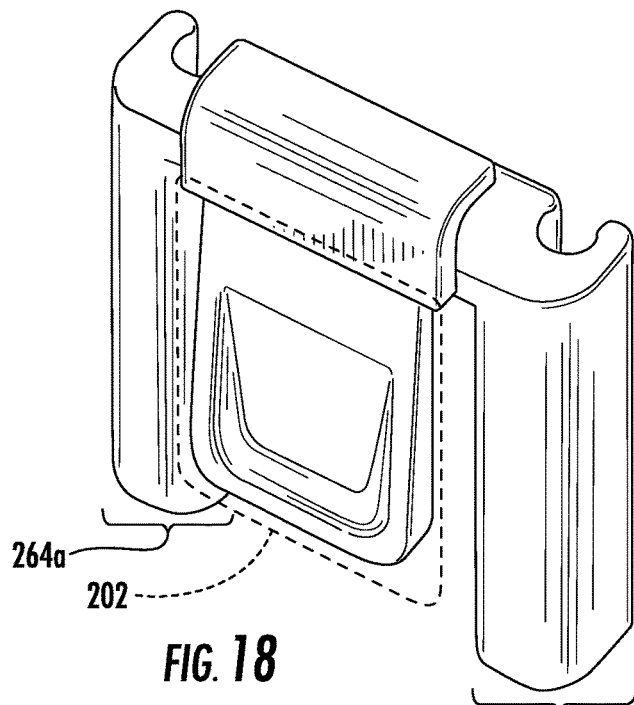
FIG. 18 is an enlarged perspective view of the latching mechanism shown in FIG. 16.
Figure 19:
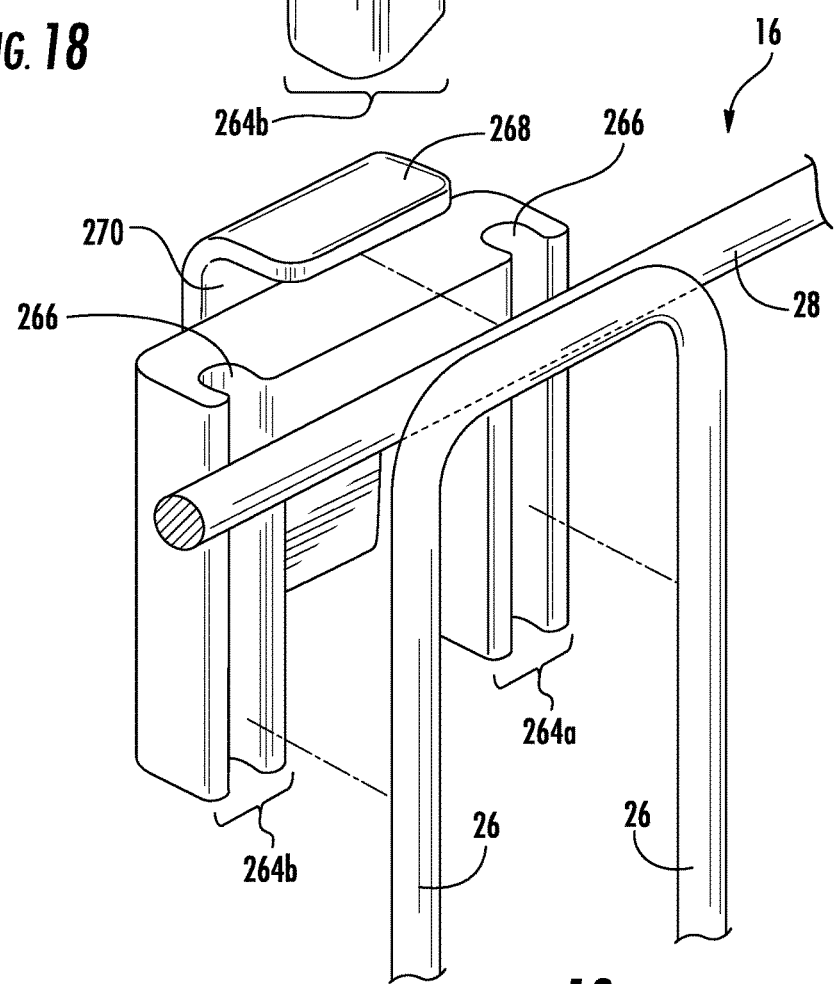
FIG. 19 is a rear exploded perspective view of the latching mechanism shown in FIG. 17.
Figure 20B:
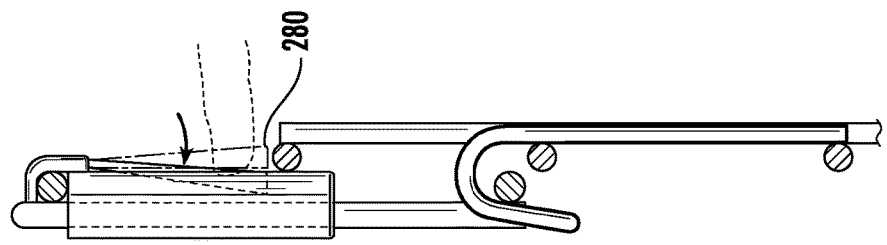
FIG. 20B is a side cross-sectional view of the latching mechanism and door shown in FIG. 20A.
Figure 20A:
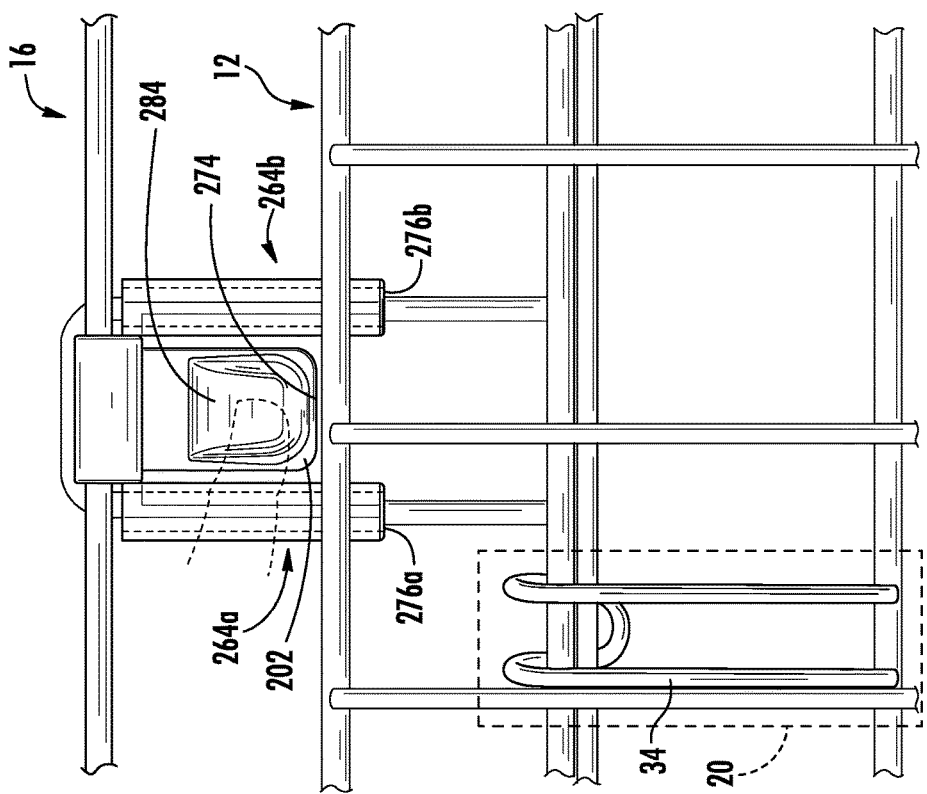
FIG. 20A illustrates the latching mechanism shown in FIG. 17 when a person depresses the latching mechanism in order to allow the door to be traversed to the opened position.
Figure 22B:
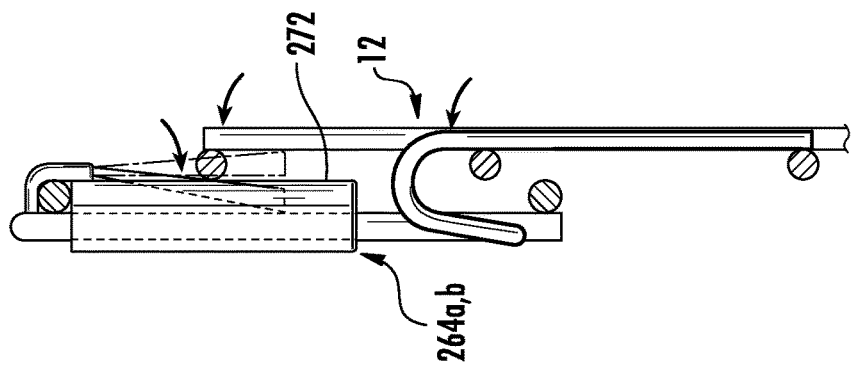
FIG. 22B illustrates a side cross-sectional view of the door and latching mechanism of FIG. 22A.
Figure 22A:
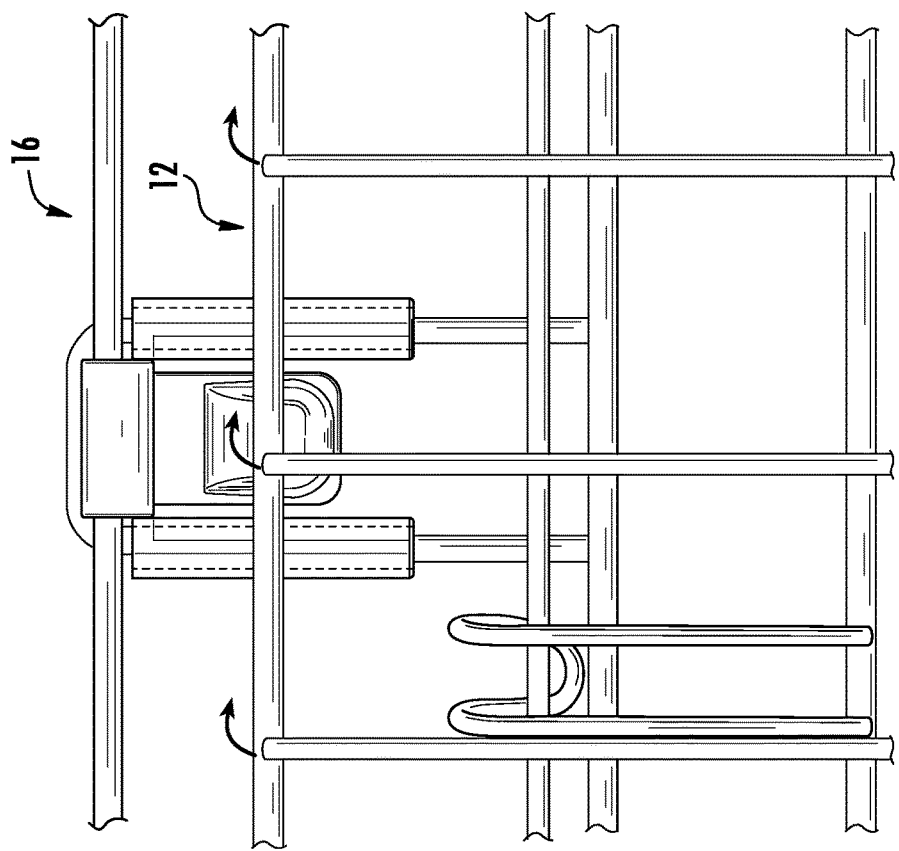
FIG. 22A illustrates the door shown in FIG. 21C being traversed to a closed position.

More particularly, the latching mechanism 200 may have first and second columns 264a, b that are secured to the vertical wire rods 26 of the panel 16, as shown in FIG. 17. The first and second columns 26a, b may have a C shaped channel 266 that extends along a height of the columns 264a, b so that the columns 264a, b may be snapped over the vertical wire rods 26 of the panel 16, as shown in FIGS. 18 and 19. The latching mechanism 200 is prevented from sliding up and down the vertical wire rods 26 by providing a lip 268 disposed at an upper portion of the latching mechanism 200. The lip 268 forms a channel 270 which receives the horizontal wire rod 28 of the panel 16. As such, the latching mechanism 200 is fixedly attached to the panel 16 by way of the horizontal and vertical wire rods 28, 26. When the latching mechanism 200 is mounted to the panel 16, the tab 202 protrudes outward from front surfaces 272 of the first and second columns 264a, b, as shown in FIG. 21C. When horizontal wire rod 28a of the door 12 is disposed immediately below a lower surface 274 of the tab 202, as shown in FIG. 20A, this prevents the pet from lifting the door 12 with his or her paw or nose. Moreover, the horizontal wire rod 28a of the door 12 is disposed above lower end 276a, b of the first and second columns 264a, b. The locks 20 limit rotational movement of the door 12 about the vertical wire rod 18 of the panel 16 which in turn also limits the distance the horizontal wire rod 28a can be swung away from the tab 202 of the latching mechanism 200. Preferably, a thickness of the tab 202 is sufficiently great so that a front edge 280 (see FIG. 20B) of the tab 202 extends beyond the maximum movement of the door 12 when in the closed position as limited by the hooks 34 of the locks 20. Preferably, the front edge 280 of the lower surface 274 of the tab 202 extends to or beyond a midpoint of the horizontal wire rod 28a of the door 12. More preferably, the front edge 280 of the lower surface 274 of the tab 202 extends beyond the entire horizontal wire rod 28a of the door 12.

To open the door 12, the tab 202 must be displaced out of the way so that the door 12 can be lifted up. When the tab 202 is disposed above the horizontal wire rod 28a of the door 12, the horizontal wire rod 28a bumps into the tab 202 to prevent upward lifting of the door 12. To displace the tab 202 out of the way from the horizontal wire rod 28a of the door 12, the handler need only push the tab 202 inward (see FIG. 20B). To facilitate such inward pushing of the tab 202, the front surface 282 of the tab 202 may have an indentation 284. The indentation 284 receives a finger (i.e., index finger) 286 of the handler and prevents the finger 286 from slipping off of the tab 202. In pushing the tab 202 inward, the tab 202 is displaced away from the horizontal wire rod 28a to allow the handler to lift the door 12 upward to traverse the door 12 from the closed position to the opened position.

In operation, from the closed position, the handler may open the door 12 by first pushing the tab 202 inward. (see FIGS. 20A and 20B). The handler places his or her finger on the front surface 282 of the tab 202 and in the indentation 284. The handler pushes forward and moves the tab 202 out of the way from the horizontal wire rod 28a of the door 12. There may be a back stop that prevents excessive bending of the tab 202 to prevent accidental breakage of the tab 202. In this position, the latching mechanism 200 is in a released position. With the other hand, the handler may then lift the door upward to unlock the locks 20 for traversal of the door 12 to the opened position. (see FIGS. 21A, 21B and 21C). Although it is simpler for the handler to push the tab 202 with one hand and lift the door 12 with the other hand, it is also contemplated that given some practice, the handler may push the tab 202 with the index finger of one hand and lift the door 12 with the thumb or other fingers of the same hand to open the door 12. The door 12 may now be traversed to the opened position.

From the opened position, the handler may close the door 12 by lifting the door 12 upward so that the locks 20 may be engaged when the door 12 is dropped or released later on. After lifting the door 12, the handler rotates the door 12 (see FIGS. 22A and 22B) so that the horizontal wire rod 28a of the door 12 contacts the front surfaces 272 of the first and second columns 264a, b. The handler continues to push the horizontal wire rod 28a of the door 12 into contact with the front surfaces 272 of the first and second columns 264a, b while slowly letting the door 12 drop downward, as shown in FIGS. 23A and 23B. During this motion, the horizontal wire rod 28a of the door 12 continues to push the tab 202 inward and out of the way. Moreover, the locks 20 begin to engage. When the horizontal wire rod 28a of the door 12 traverses below the tab 202, the tab 202 is traversed toward the out direction through its own resiliency (see FIG. 17) or a spring. The lower surface 274 of the tab 202 is now disposed immediately above the horizontal wire rod 28a of the door 12. In this position, the latching mechanism 200 is in the engaged position. The latching mechanism 200 may be is fabricated from a material which allows for some bendability but returns to its original shape or position, and thus, may be considered to be resilient.

Referring now to FIGS. 24-28, a fourth embodiment of the latching mechanism 300 is shown. The latching mechanism 300 is shown as being utilized on a door 312 that is pivoted upward and downward to open and close the door 312 on the panel 316. The operation of the door 312 is described in U.S. provisional patent application Ser. No. 62/027,046, filed on Jul. 21, 2014, the entire contents of which is expressly incorporated herein by reference.

The latching mechanism 300 is mounted to the door 12 and operated to engage the horizontal wire rod 28a of the panel 16. When the latching mechanism 300 is in the released position, a catch 364 releases the horizontal wire rod 28a of the panel 16 as well as is traversed out of the way to prevent interference between the catch 364 and the horizontal wire rods 28, 28a of the panel 316 as the door 312 is being pivoted upward to open the door 312.

Figure 26:
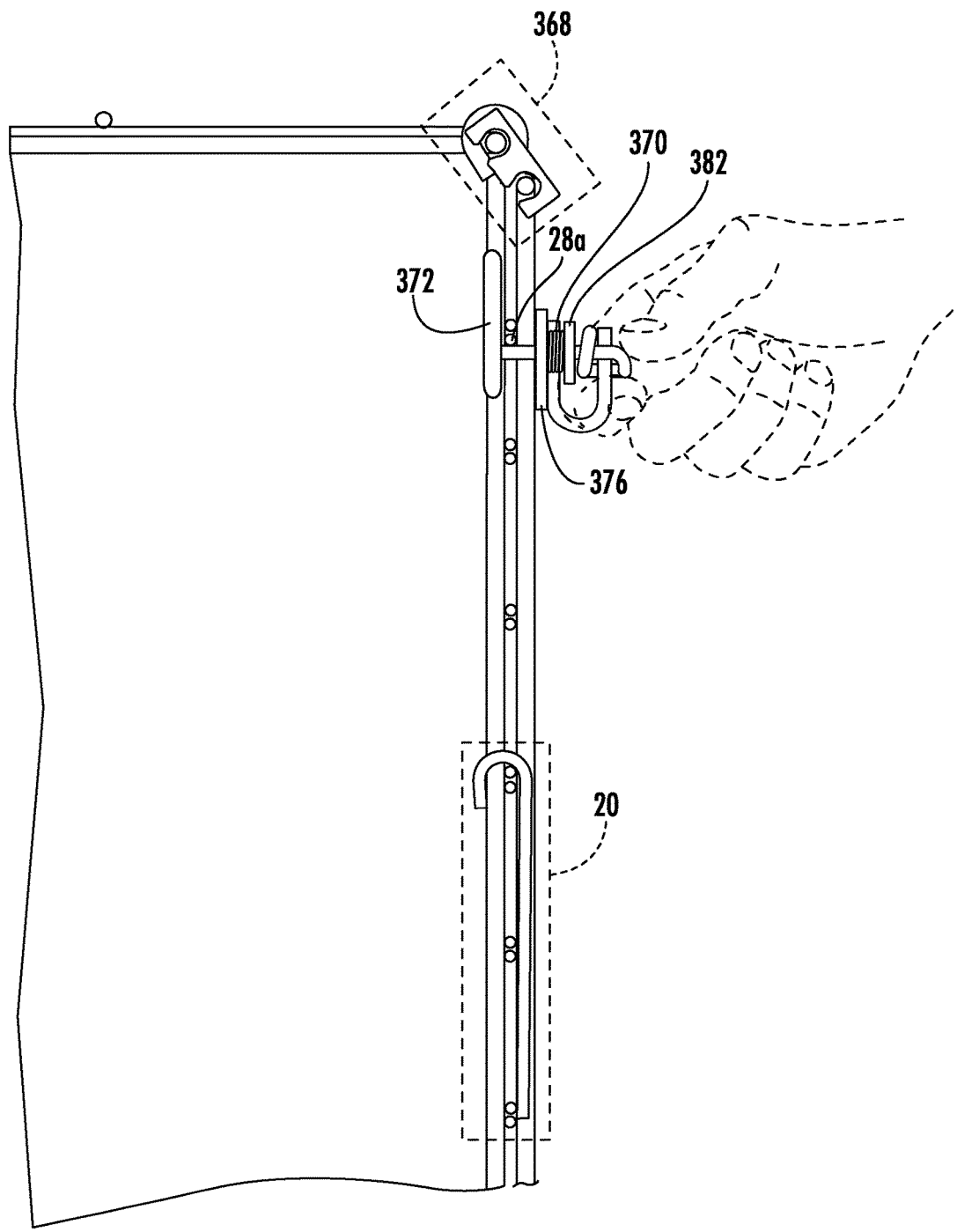
FIG. 26 is a side view of the latching mechanism shown in FIG. 25.
Figure 27:
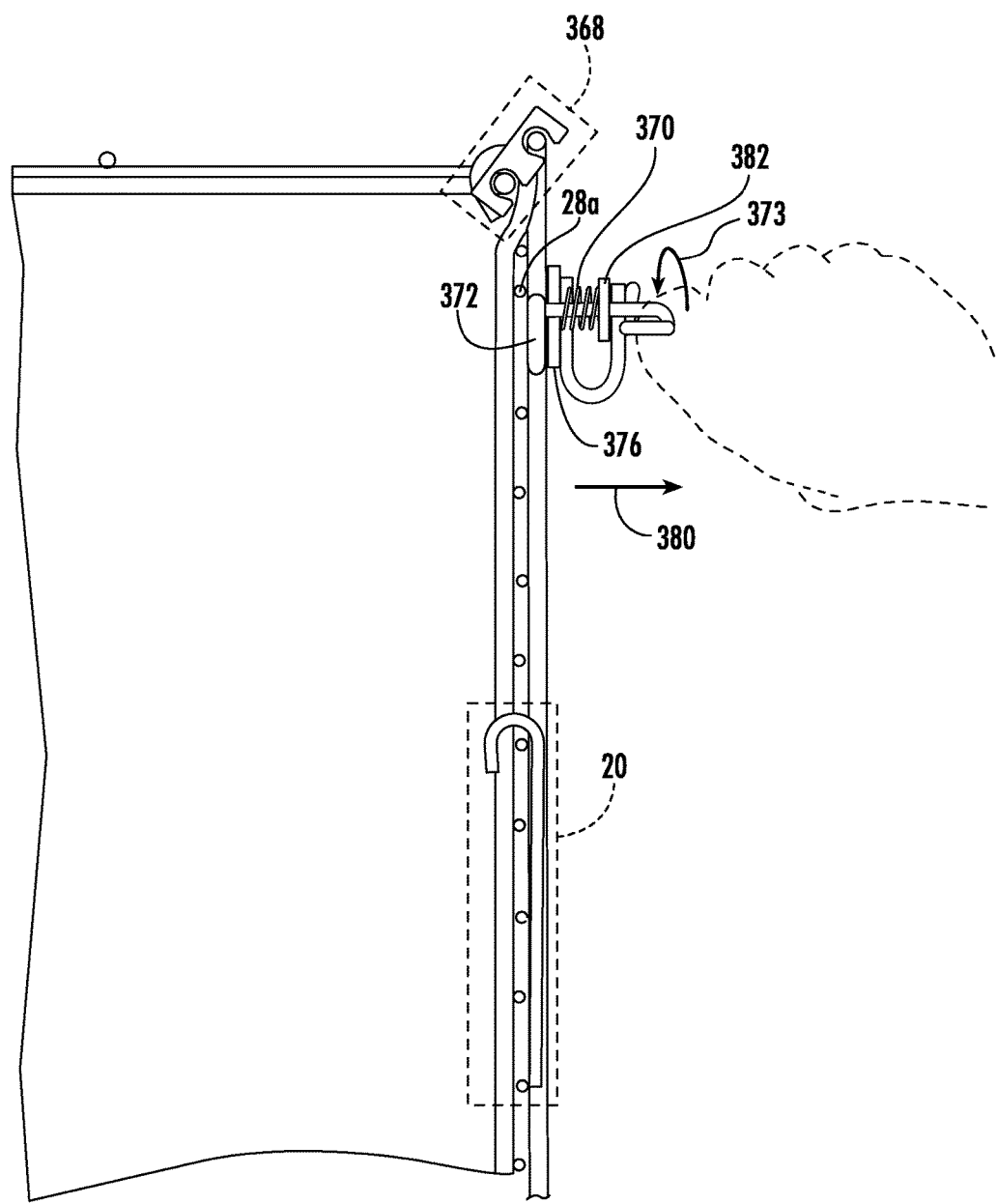
FIG. 27 illustrates the latching mechanism shown in FIG. 26 being unlocked.
Figure 28:
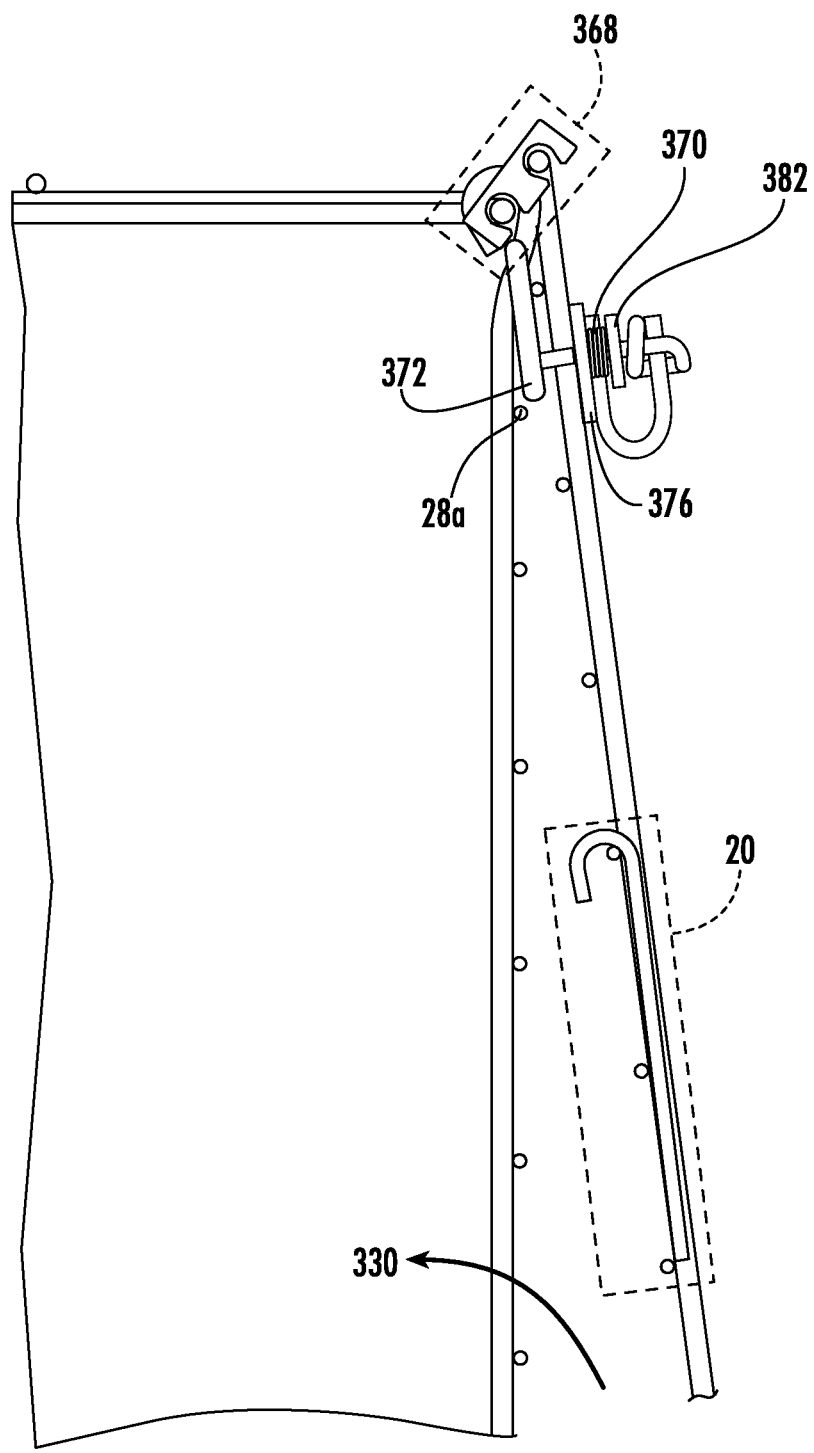
FIG. 28 illustrates the door being lifted up so that the door can be pivoted to the opened position.

The pet crate 332 also has locks 20 that prevent the pet from pushing the door 312 open when the pet is in the pet crate 332. To open and close the door 312, the handler traverses the latching mechanism 302 to the released position (dash lines in FIG. 25) from an engaged position (phantom lines in FIG. 25). When the latching mechanism is in the released position, the handler may grip a handle 366 to initially lift the door 312 upward to disengage the locks 20. When the door 312 is lifted upward, a dual axis hinge 368 rotates, as shown in FIG. 26. When the locks 20 are disengaged, the door 312 may now be pivoted upward to open the door and allow the pet to enter or exit the pet crate 332 through the opening 330 formed in the panel 316, as shown in FIGS. 27 and 28.

The latching mechanism 300 may be mounted to the door 312. Preferably, the latching mechanism 300 is mounted to a center of the door 312 with respect to its hinge 368, as shown in FIG. 24. The latching mechanism 300 is shown as being attached to the upper side of the door 312. However, it is also contemplated that the latching mechanism 300 may be mounted to the bottom side or either of the left and right sides of the door 312. If the latching mechanism 300 is mounted to side of the doors 312, it is preferable that one latching mechanisms 300b are mounted to each of the left and right sides of the door 312. Regardless of the position of the latching mechanism 300 on the door 312, the latching mechanism 300 is positioned to engage a horizontal wire rod 28a of the panel 16 when the latching mechanism 300 is in the engaged position in that the catch 364 prevents lateral movement as well as vertical movement of the door 312.

Referring to FIG. 25, the catch 364 is attached to a handle 370 which is operative to rotate the catch 364 between the engaged position and the released position. In the engaged position, the catch 364 has a protrusion 372 that extends upward behind the horizontal wire rod 28a of the panel 16. The protrusion 372 prevents the door 312 from being pushed forward by the pet within the pet crate 332.

Moreover, the protrusion 372 is attached to a guide rod 374. A distal portion 375 of the guide rod 374 also forms part of the catch 364. The distal portion of the guide rod 374 is disposed under the horizontal wire rod 28a of the panel 16 and prevents upward traversal of the door when the catch 364 is in the engaged position so that the door 12 cannot be traversed upward.

The guide rod 374 is mounted to a guide plate 376. The guide plate 376 is mounted to the panel 316 such as by welding or other means known in the art. The guide plate 376 has a through hole through which the guide rod 374 is disposed.

In the released position shown in dash lines in FIG. 25, the distal portion of the guide rod 374 is not disposed beneath the horizontal wire rod 28a of panel 16. Moreover, the protrusion 372 is not disposed behind the horizontal wire rod 28a of the panel 16 as well. This prevents interference between the catch 364 of the latching mechanism 300 and the wire rods 28, 28a of the panel 16.

In order to traverse the catch 364 to the released position, the handler rotates the handle 370 in a counterclockwise direction 373. In doing so, the protrusion 374 is rotated away from behind the horizontal wire rod 28a. Once the protrusion 372 clears the horizontal wire rod 28a, a spring 378 pushes the protrusion 372 in the direction of arrow 380. The protrusion 372 is now disposed beneath and preferably in front of the horizontal wire rod 28a when the catch 364 and the latching mechanism 300 are in the released position as shown by a comparison between FIGS. 26 and 27. This spring 378 is disposed between the guide plate 376 and a backstop 382 mounted to the guide rod 374.

Also, handle 370 of the latching mechanism 300 may be engaged to a bracket 384. The bracket 384 may be attached to the front side of the guide plate 376 or its rear side. The handle 370 may have an aperture 386 in which the bracket 384 is received. The bracket 384 is fixedly secured to the guide plate 376. As discussed above, the spring 378 biases the catch 364 in the direction of arrow 380 (see FIG. 27). However, either the protrusion 372 may push against the horizontal wire rod 28a or the handle 370 may push against the bracket 384. Moreover, in discussing the traversal of the catch 364 from the engaged position to the released position, it has been described that the catch 364 moves toward the guide plate 376 when the protrusion 372 clears the horizontal wire rod 28a. However, it is also contemplated that the bracket 384 may be made sufficiently long so that the protrusion 372 does not traverse toward the guide plate 376 until the handle 370 clears the distal end of the bracket 384.

With the catch 364 in the released position, the protrusion 372 of the distal portion of the guide rod 374 is displaced in front of the horizontal wire rod 28a of panel 16, as shown in FIG. 27. The handler may now grip the handle 366 of the door 312, lift upward to unlock the lock 20 and rotate the door 312 upward to allow the pet to enter or exit the pet crate 332, as shown in FIG. 28.

To close or traverse the door 312 to the closed position, the handler may rotate the door 312 downward until the locks 20 are engaged. The handler then pushes the handle 370 inward so that the protrusion 372 is now disposed behind the horizontal wire rod 28a. With the protrusion 372 disposed behind the horizontal wire rod 28a, the handler turns the handle 370 in the clockwise direction to move the protrusion 372 immediately behind the horizontal wire rod 28a. Moreover, the handle 370 is rotated in the clockwise direction until the bracket 384 is received in the aperture of the handle 370. The latching mechanism 300 has now been traversed to the engaged position. The pet cannot lift the door 312 upward to open the door 312.

The catch 364 has been described as being traverse from the engaged position to the released position by rotating the handle 370 in the counterclockwise direction. However, the reverse direction is also contemplated. In this regard, the handle 370 would be disposed on the left side with the bracket 384 while the protrusion 372 is in its current position shown in FIG. 21.

Figure 29:
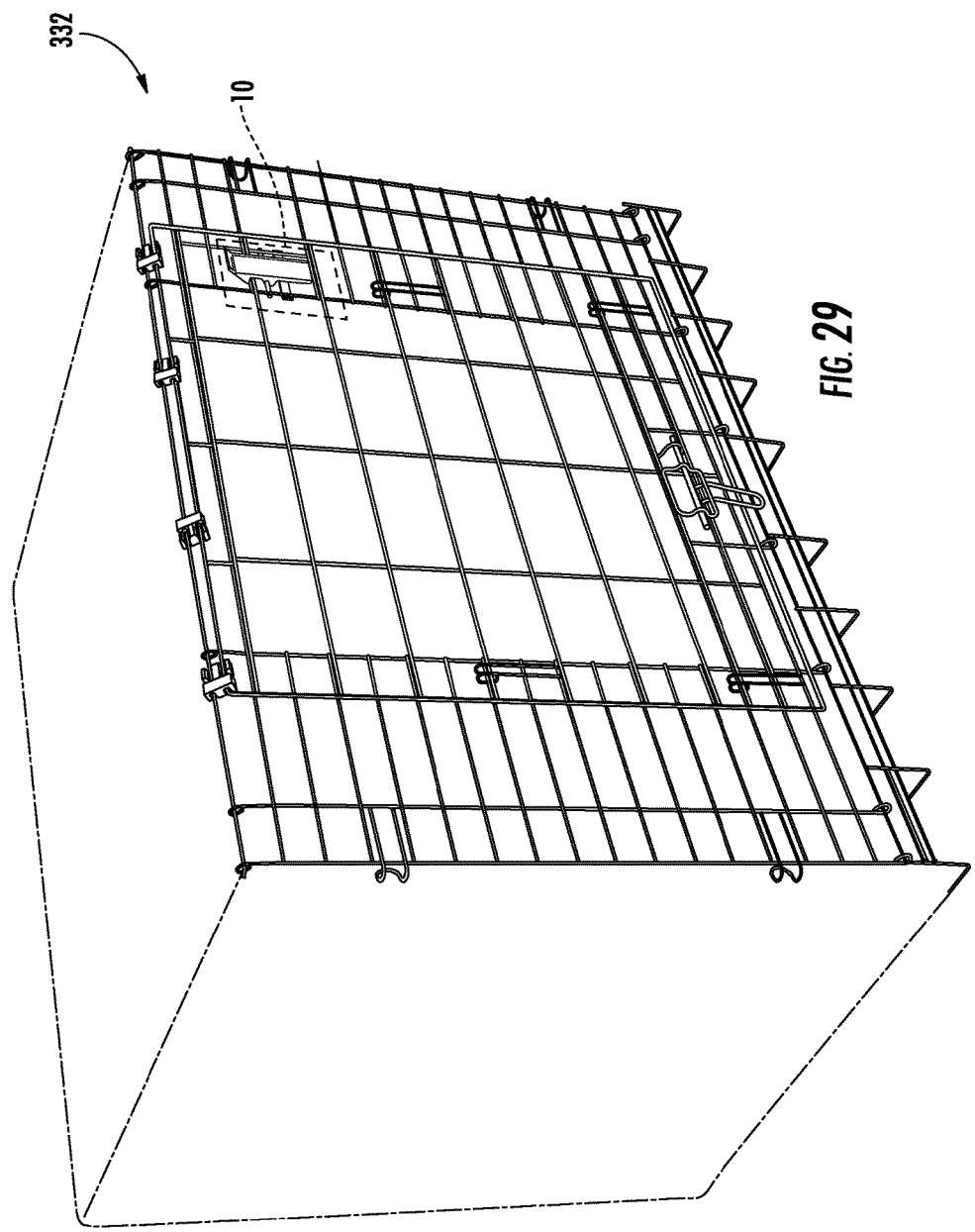
FIG. 29 illustrates the first embodiment of the latching mechanism on a door that is pivoted upward.
Figure 30:
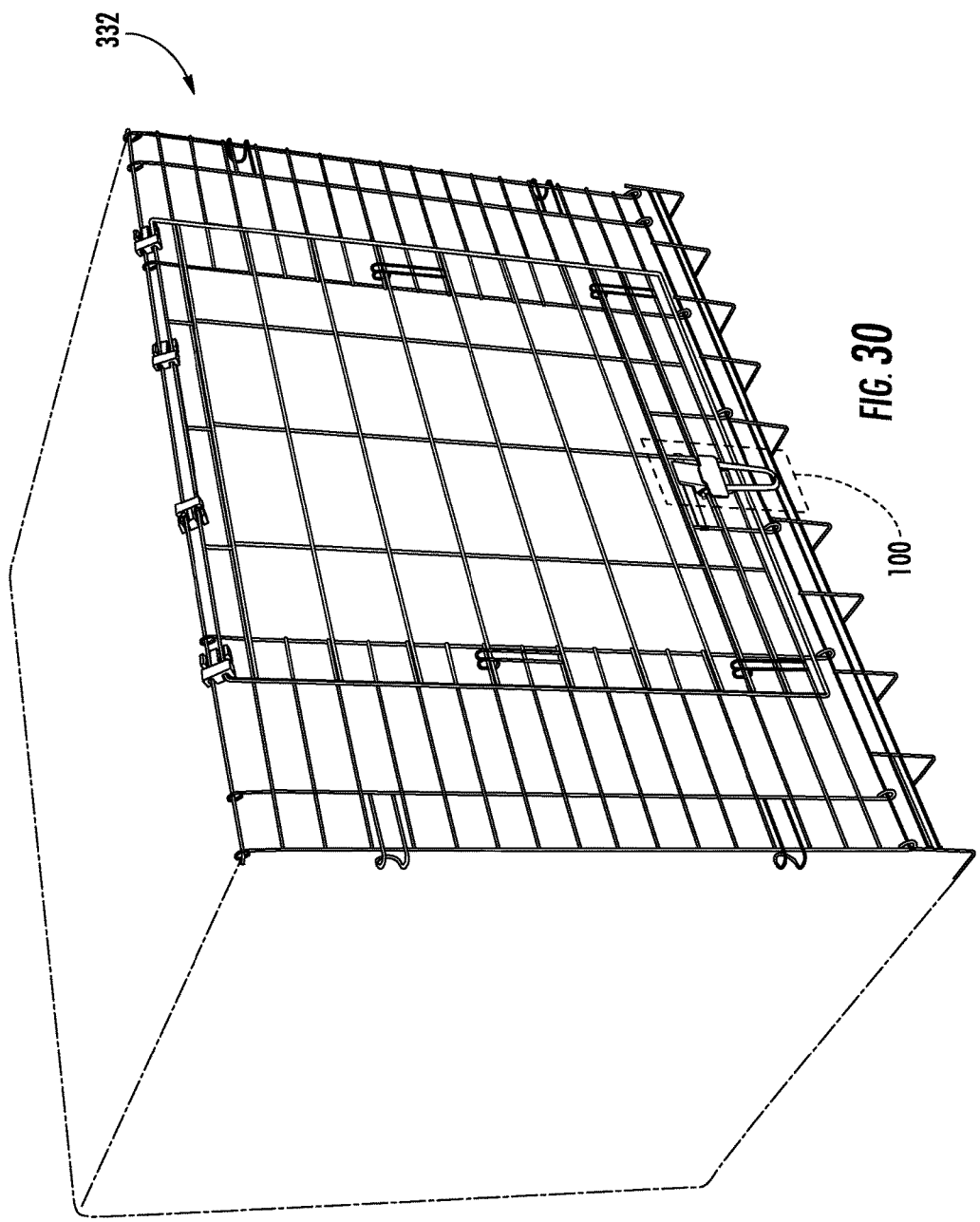
FIG. 30 illustrates the second embodiment of the latching mechanism on a door that is pivoted upward.
Figure 31:
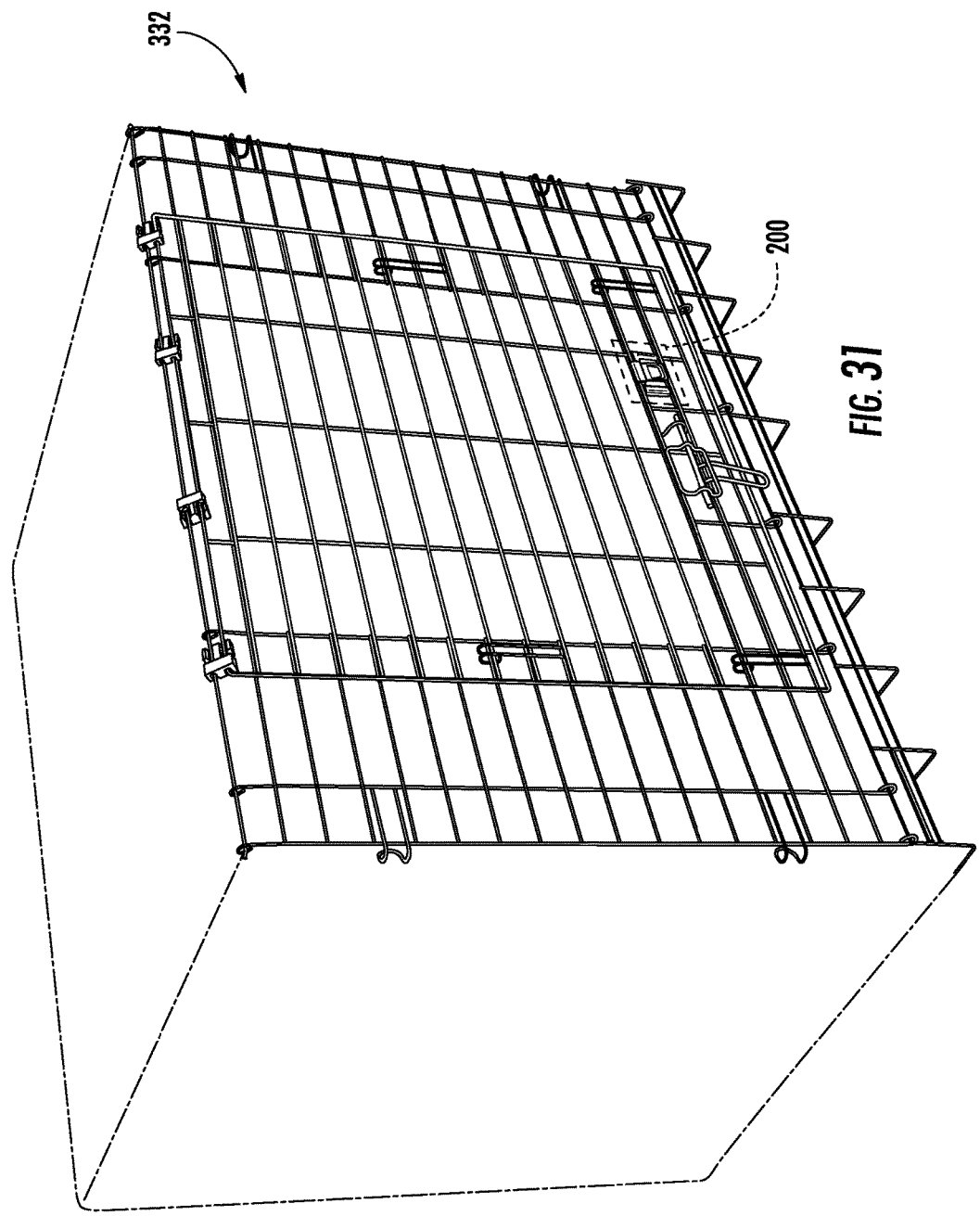
FIG. 31 illustrates the third embodiment of the latching mechanism on the door that is pivoted upward.
Figure 32:
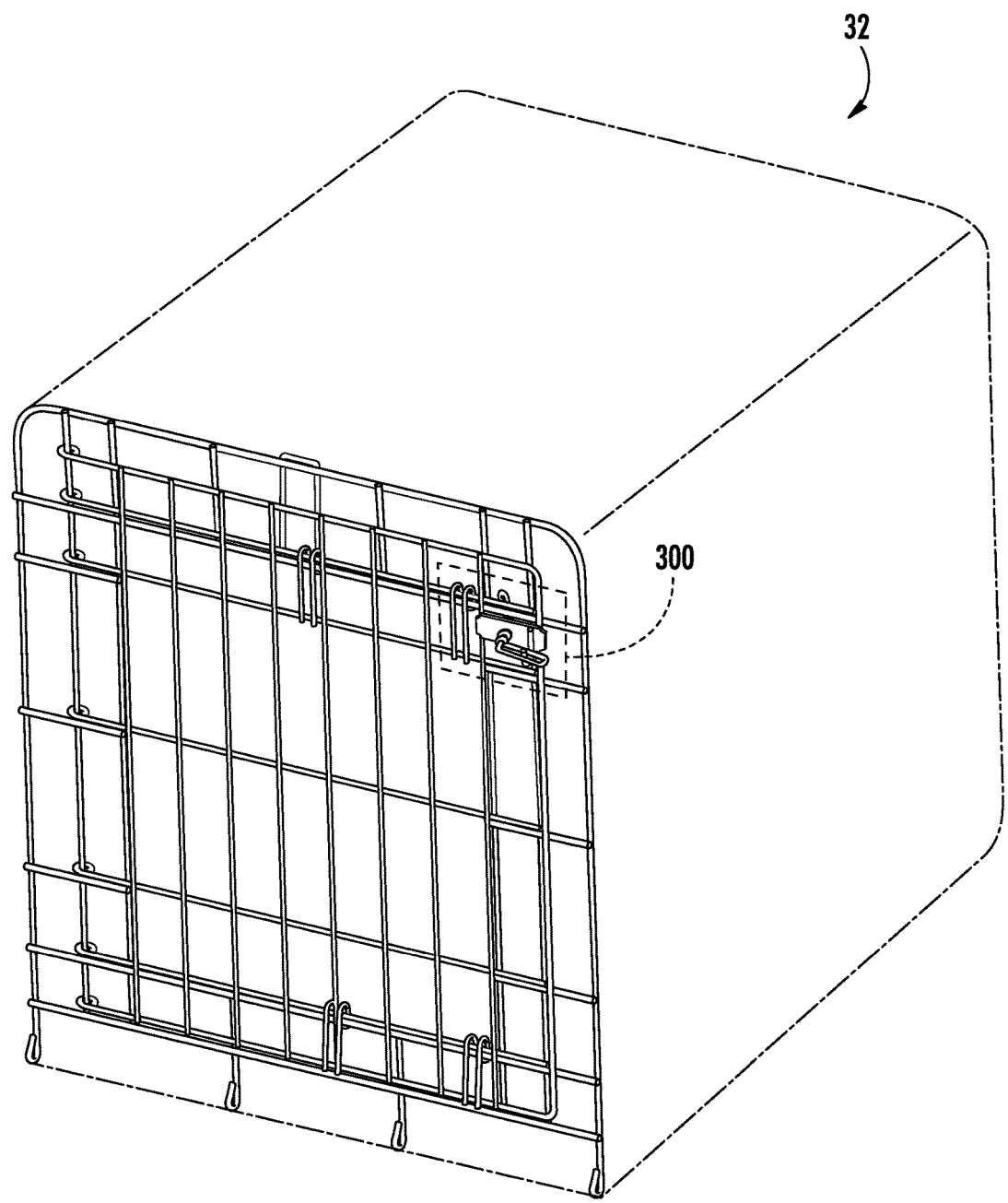
FIG. 32 illustrates the fourth embodiment of the latching mechanism on the door that is pivoted horizontally.

Referring now to FIGS. 29-32, the latching mechanisms 10, 100, 200, 300, 400 may be incorporated into doors 12 that pivot vertically upward or laterally. By way of example and not limitation, as shown in FIGS. 29-31, the latching mechanisms 10, 100, 200, 300 as shown in FIGS. 1, 7 and 14 may be incorporated into the door 312 shown in FIG. 21. It is also contemplated that the latching mechanism 400 may be incorporated into door 312 shown in FIG. 21 in the same manner as latching mechanism 100 as shown in FIG. 30. Also, as shown in FIG. 29, the latching mechanism 300 shown in FIG. 21 may be incorporated into the laterally opened door 12 shown in FIG. 1.

Figure 36:
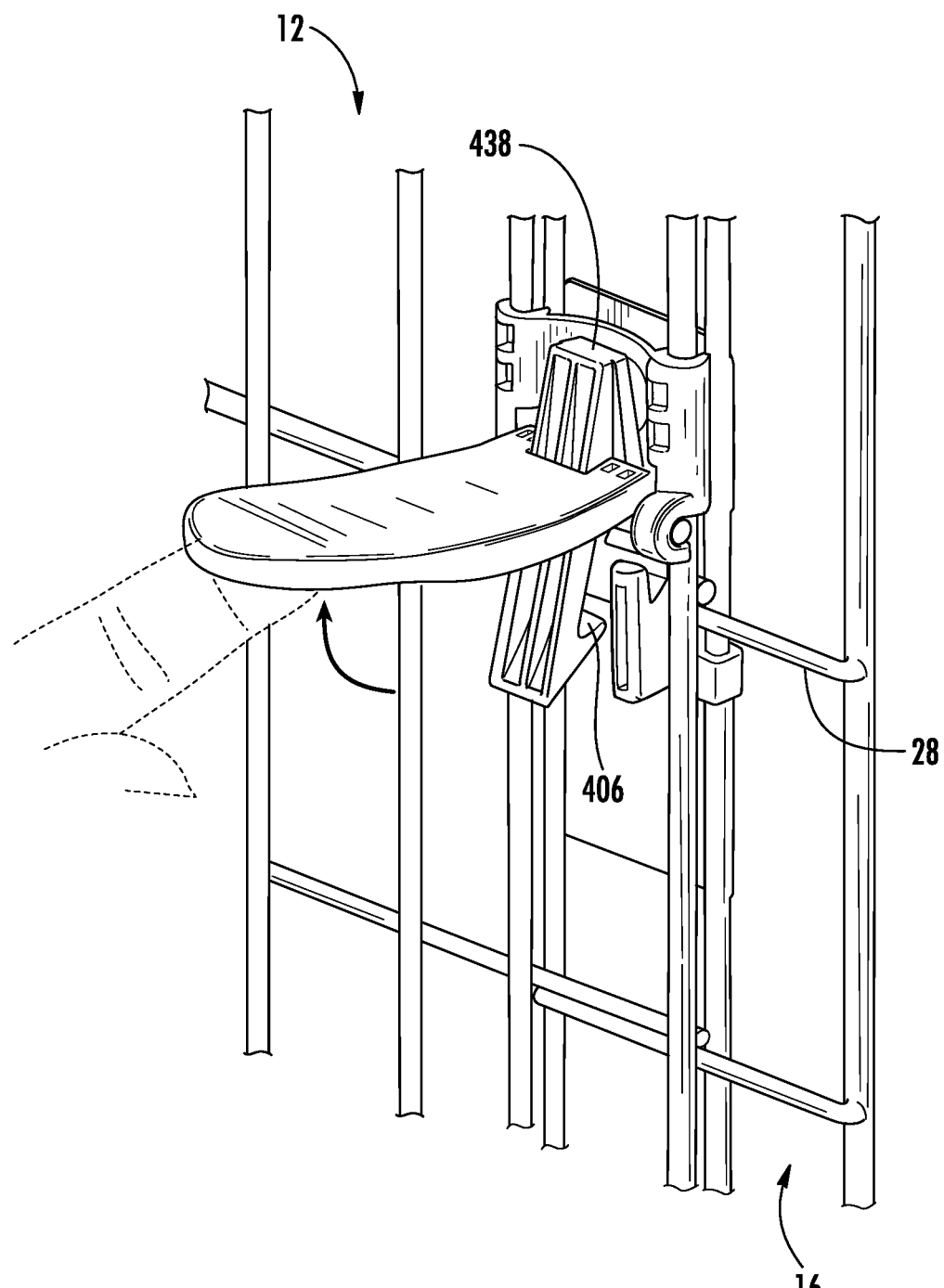
FIG. 36 illustrates the latching mechanism shown in FIG. 33 with the handle fully lifted upward so that the body is fully rotated and a hook of the body is disengaged from a horizontal wire rod of the panel.
Figure 37:
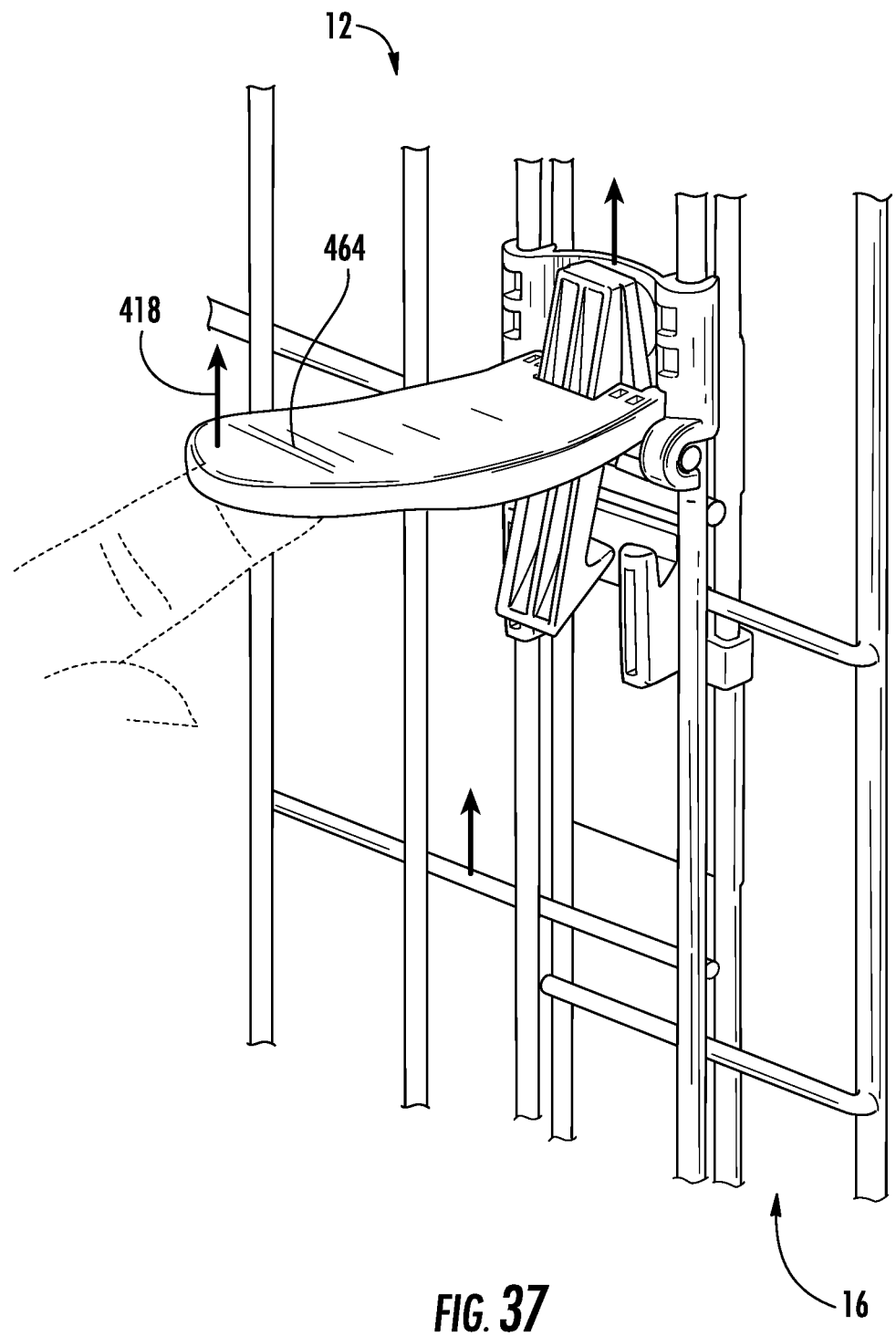
FIG. 37 illustrates the door of FIG. 36 when the door is lifted upward after the fifth embodiment of the latching mechanism is disengaged.
Figure 38:
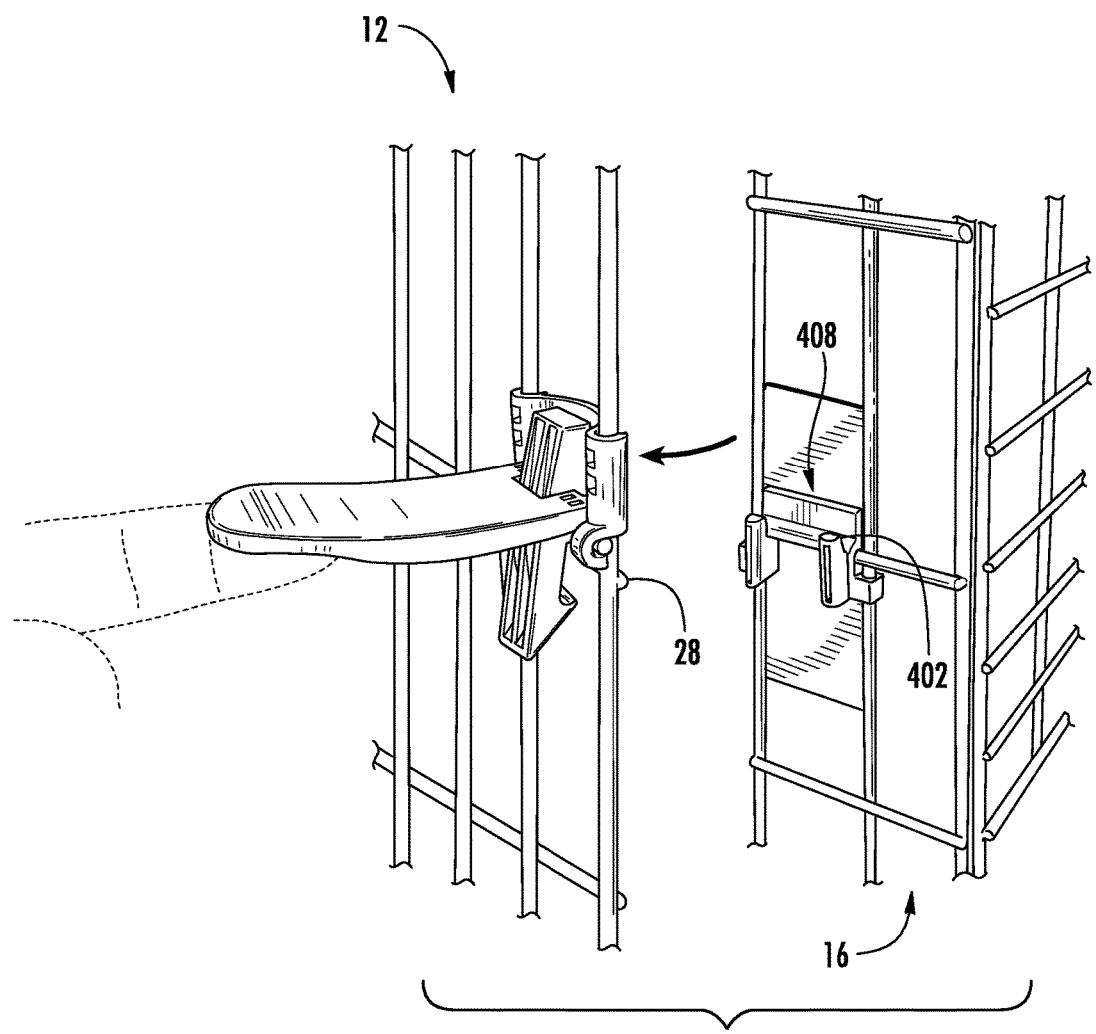
FIG. 38 illustrates the door being pivoted to an opened position.
Figure 39:
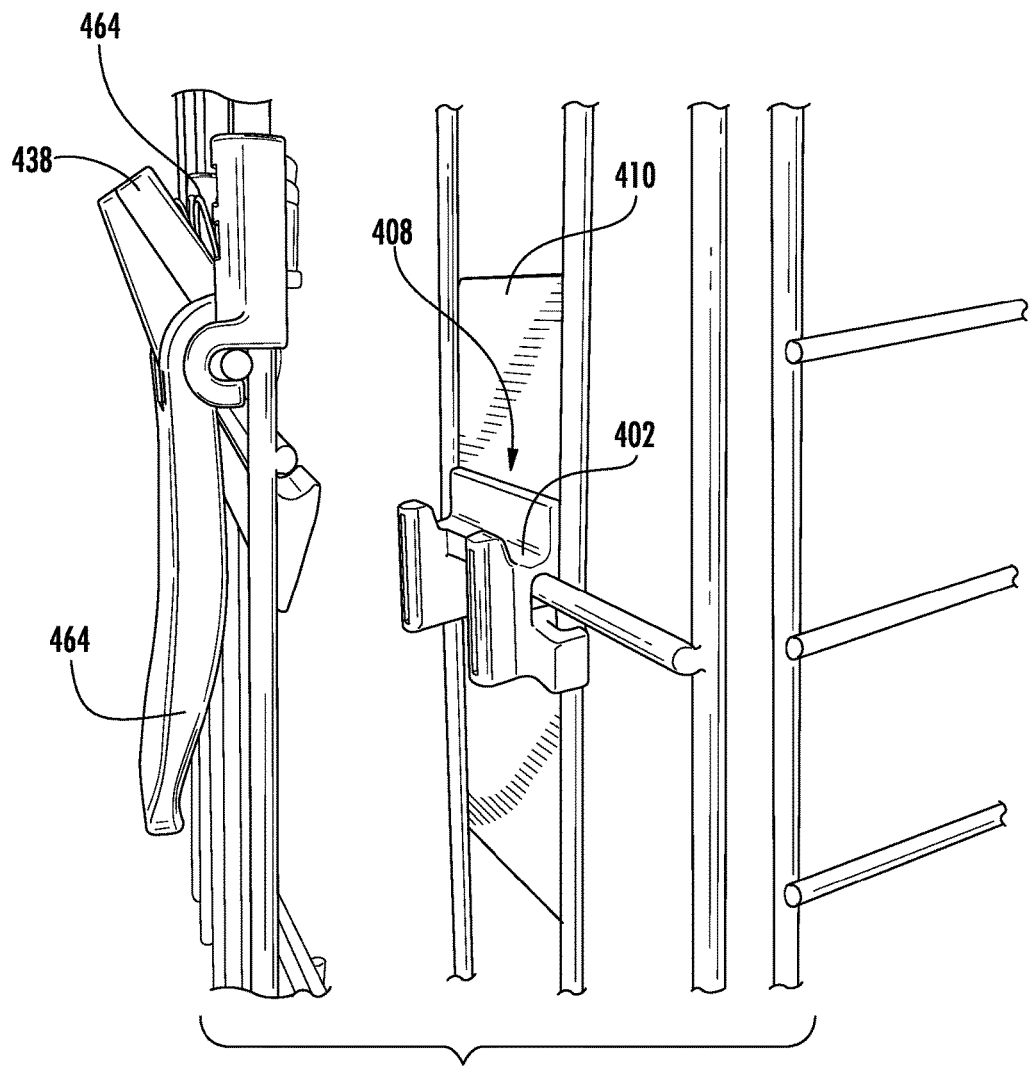
FIG. 39 illustrates the fifth embodiment of the latching mechanism in its normal state with the door in the opened position.
Figure 40:
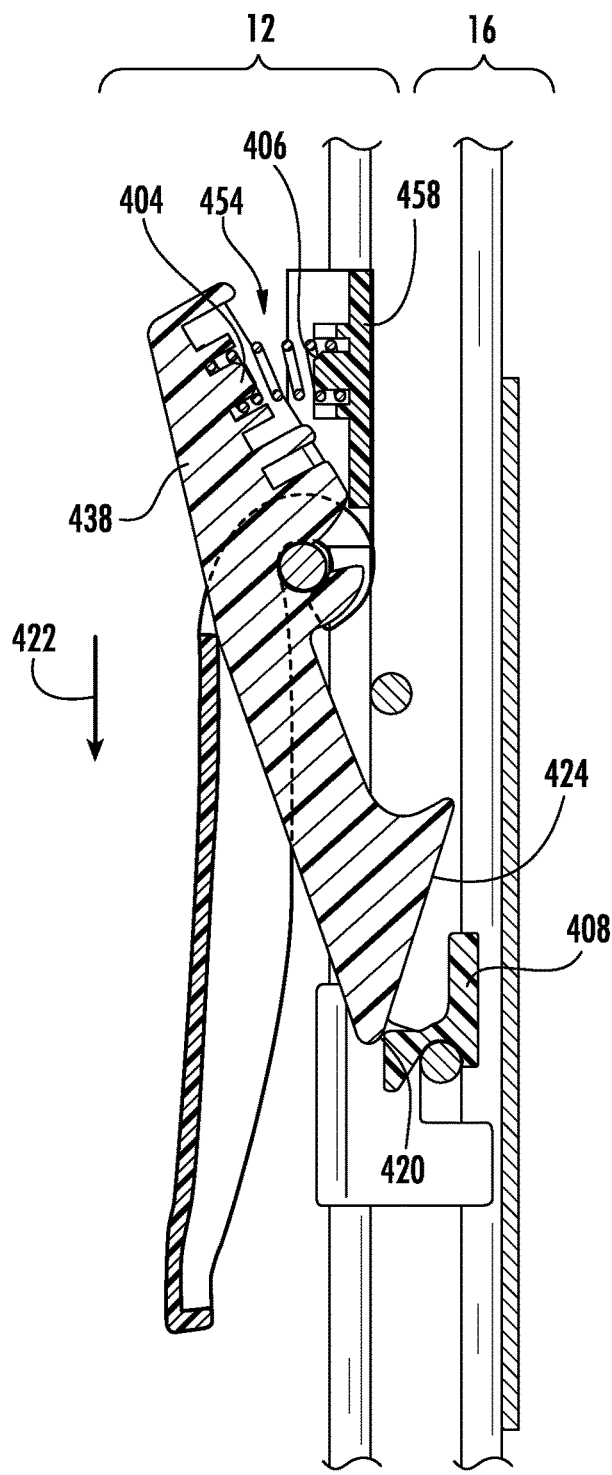
FIG. 40 is a cross-sectional view of the latching mechanism shown in FIG. 33 when the door is pushed against the panel in preparation of engaging the latching mechanism.
Figures 41, 42:
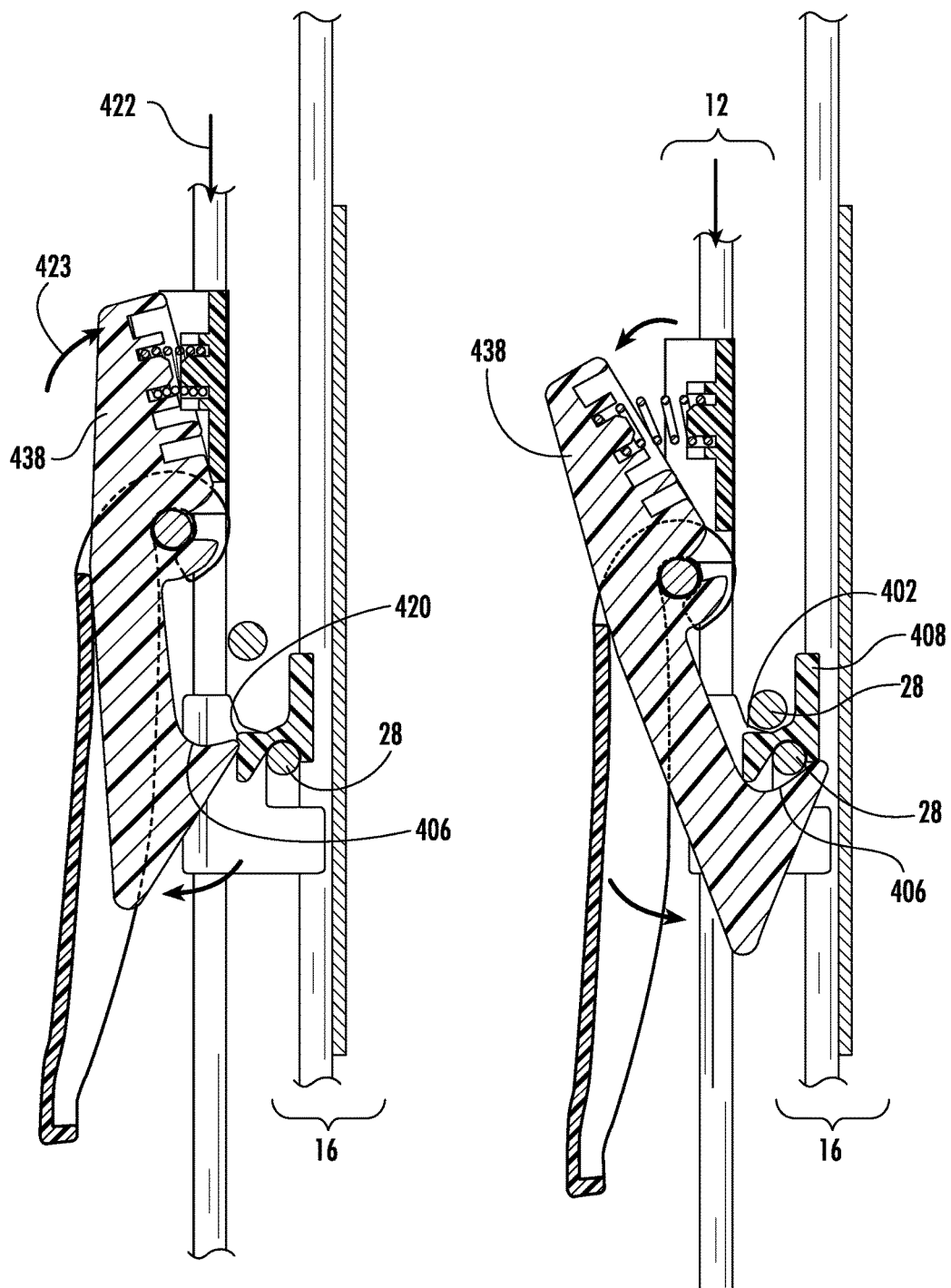
FIG. 41 is a cross-sectional view of the latching mechanism shown in FIG. 33 with the latching mechanism on its way to the engaged position.
FIG. 42 is a cross-sectional view of the latching mechanism shown in FIG. 33 with the latching mechanism fully engaged.

Referring now the FIGS. 33-42, a fifth embodiment 400 of the latching mechanism 400 is shown. The latching mechanism 400 is similar to the latching mechanism 100 as shown in relation to FIGS. 8-15 except for the following features explained below. By way of example and not limitation, the frame or panel 16 has a hook 402 that receives a horizontal wire rod 28 of the door 12, as shown in FIGS. 38 and 42. Similar to the embodiment shown in FIGS. 8-15, the latching mechanism 400 also allows for the door 12 to be opened and closed with one hand instead of requiring two hands.

Figure 33:
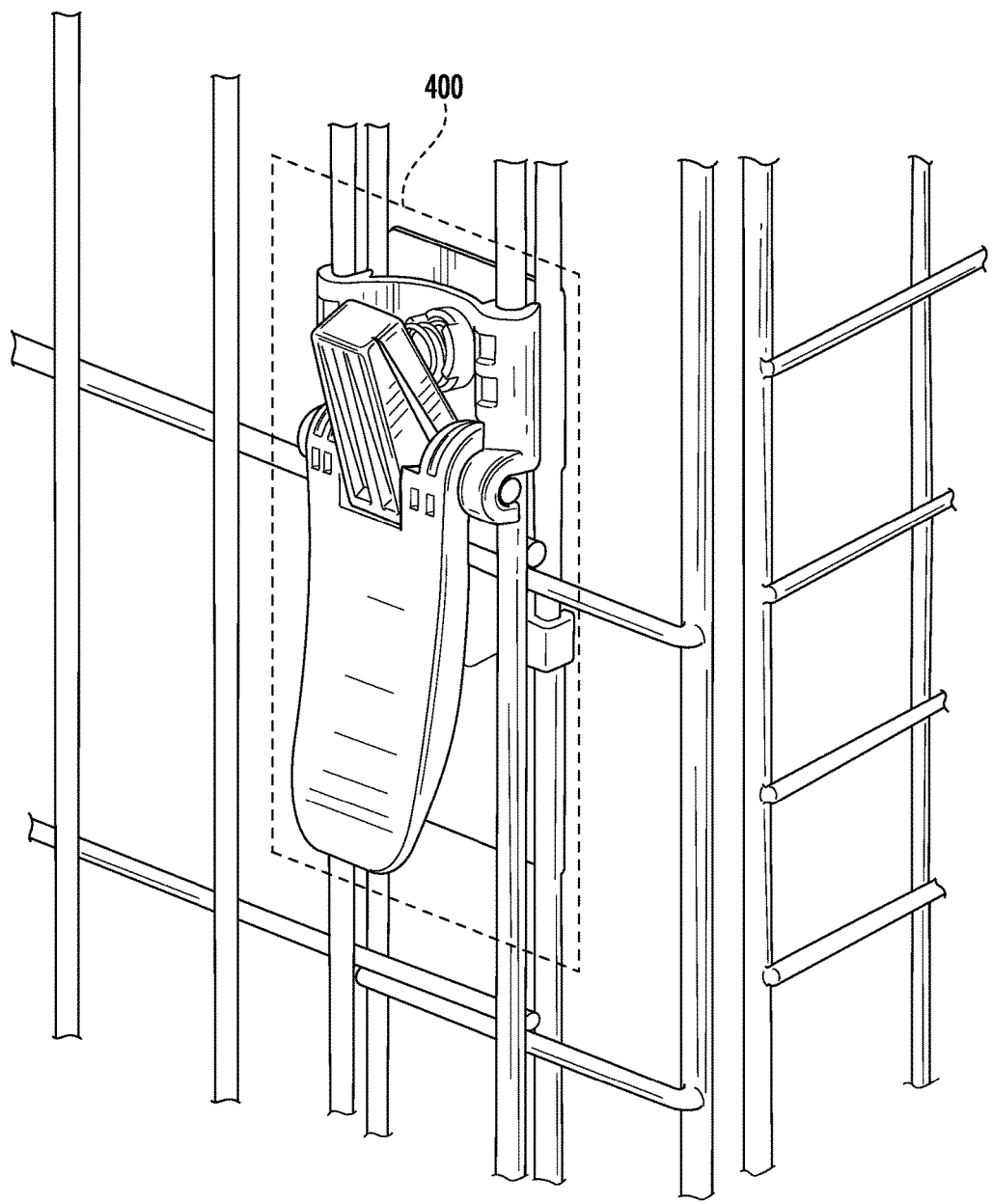
FIG. 33 is a perspective view of the door of a pet crate traversed to the closed position and a fifth embodiment of the latching mechanism.
Figure 34:
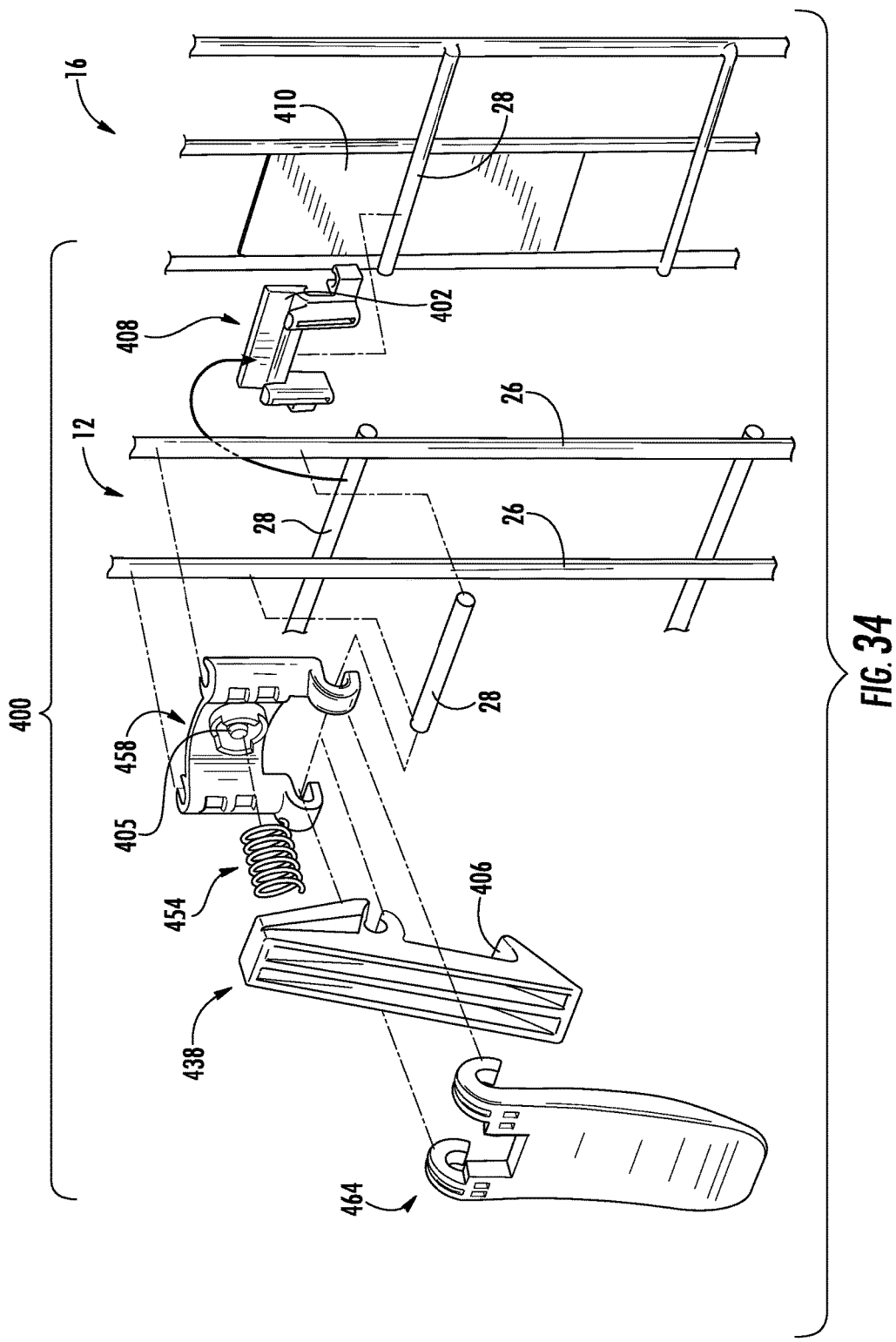
FIG. 34 is an enlarged exploded perspective view of the latching mechanism shown in FIG. 33.

Referring now to FIG. 34, the latching mechanism 400 may have a body 438 and handle 464 which rotatably snap onto horizontal wire rod 28. The body 438 is nested within the handle 464, as shown in FIG. 33. The horizontal wire rod 28 is secured (e.g., welded) to the vertical wire rods 26 of the door 12. Guide plate 458 may be snapped onto the vertical and horizontal wire rods 26, 28 of the door 12. The guide plate 458 receives the spring 454 to maintain the body 438 in the engaged position (see FIGS. 33 and 42 when the door 12 is in the closed position. The back side of the body 438 has a locating pin 404 as shown in FIG. 40. Additionally, the guide plate 458 also has a corresponding locating pin 405. In this manner, the guide pins 404, 405 of the body 438 and the guide plate 458 retain the spring 454 in place. The handle 464 and the body 438 are also nested within the guide plate 458, as shown in FIG. 33. During operation of the latching mechanism 400, a hook 406 of the body 438 is latched onto horizontal wire rod 28 of the panel 16 to prevent the door 12 from being lifted upward, as shown in FIG. 42. Additionally, horizontal wire rod 28 of the door 12 is received within the hook 402 of a reinforcement member 408 to further keep the door 12 in the closed position, as shown in FIG. 42.

A tamper-resistant plate 410 may be located behind the latching mechanism 400 and be mounted onto the wire rods 26, 28 of the panel 16 to prevent the animal within the enclosure from manipulating the handle 464 or the body 438 from inside the enclosure in an attempt to open the door.

Figure 35:
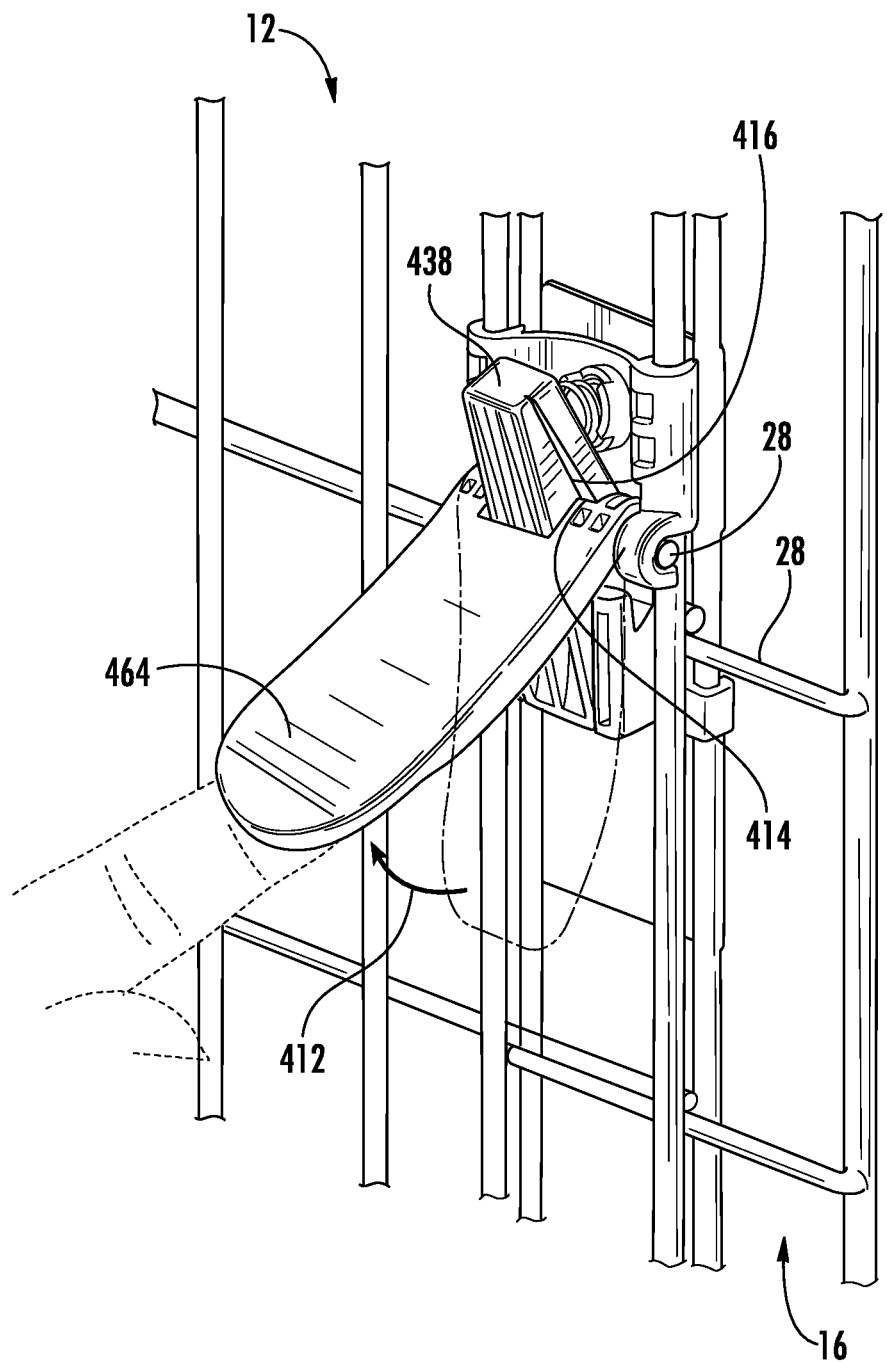
FIG. 35 illustrates the latching mechanism shown in FIG. 33 with a handle partially lifted upward.

When the door 12 is in the closed position, as shown in FIG. 35, the user can open the door 12 by first lifting the handle 464 in the up direction as shown by arrow 412. The handle 464 can freely rotate about the horizontal wire rod 28 of the door 12 until inside edges 414 of the handle 464 catch lips 416 of the body 438. The inside edges 414 and lips are on opposed sides of the handle 414 and body 438. Once the inside edges 414 of the handle 464 contact the lips 416 of the body 438, any further rotation of the handle 464 in the direction of arrow 412 will rotate the body 438 as shown in FIG. 36. When the body 430 is fully rotated as shown in FIG. 36, the hook 406 of the body 438 clears the horizontal wire rod 28 of the panel 16.

Referring now to FIG. 37, the user can now lift the handle 464 upward in the direction of arrow 418 to release the door 12 from the panel 16. The door 12 can be pivoted outward as shown in FIG. 38. When the handle 464 is released as shown in FIG. 39, the spring 454 pushes the body 438 to the engaged position. Gravity brings the handle 464 back downward. In this position, the user can grip the door 12 and need not manipulate the latching mechanism 400 directly with his or her hand to traverse the door back to the closed and locked position. Referring now to FIG. 40, the door 12 is laid against or pushed against the panel 16 as shown in FIG. 40. The door 12 is also in the up position. In this position, camming surface 424 of the body 438 contacts an edge 420 of the reinforcement member 408. The door 12 can be dropped downward in the direction of arrow 422 as shown in FIG. 41 at which time, the edge 420 rotates the body 438 in the direction of arrow 423 so that the hook 406 eventually clears the horizontal wire rod 28 of the panel 16. When the hook 406 of the body 438 clears the horizontal wire rod 28 of the panel 16, the hook 406 is received under the horizontal wire rod 28 of the panel 16. Moreover, the horizontal wire rod 28 of the door 12 is received within hook 402 of the reinforcement member 458 to further hold the door 12 to the panel 16.

Moreover, the hook 406 of the body 438 may be shaped so that the horizontal wire rod 28 of the panel 16 is further wedged into the hook 406 if the animal attempts to lift the door 12 upward without lifting the handle 464 to disengage the latching mechanism 400.

The above description is given by way of example, and not limitation. Given the above disclosure, one skilled in the art could devise variations that are within the scope and spirit of the invention disclosed herein, including various ways of hinging the door to the panel. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pet enclosure for restraining a pet within an area, the enclosure comprising:
   a panel fabricated from
      a plurality of horizontal and vertical wire rods, the horizontal and vertical wire rods forming an opening for ingress and egress of the pet;
   a door fabricated from
      a plurality of horizontal and vertical wire rods and traversable between closed and opened positions, the door being sufficiently large to cover the opening to prevent ingress and egress of the pet through the opening when the door is in the closed position and to enable ingress and egress of the pet through the opening when the door is in the opened position; and
   a latch attached to the door or the panel for keeping the door in the closed position, the latch comprising;
      a handle;
      a body; and
      a biasing mechanism,
      the handle and the body each being operatively attached to the same one of the plurality of horizontal and vertical rods of the panel or the door to which the latch is attached,
      the biasing mechanism biasing the body into an engaged position in which a portion of the body is configured to removably couple to one of the plurality of horizontal and vertical rods of the panel or the door which the latch is not attached to secure the door in the closed position, and
      wherein operation of the handle provides a force which counteracts the biasing mechanism to disengage the body portion from the wire of the panel or the door to which the latch is not attached to allow the door to be moved to the open position.

2. The enclosure of claim 1 further comprising a compression spring disposed between the body and a plate to bias the handle and the body to the engaged position, the plate being mounted to one of the door and the panel.

3. The enclosure of claim 2 wherein
   the door is vertically traversed when the door is traversed between the closed and opened positions.

4. The enclosure of claim 1 wherein the same one of the plurality of horizontal and vertical rods of the panel or the door to which the latch is attached connects the handle and the body, the wire rod being engageable with a plate for mounting the latch to the one of the door and the panel.

5. The enclosure of claim 1 wherein
   the same one of the plurality of horizontal and vertical rods of the panel or the door to which the latch is attached is a first wire rod of the door, and the body includes a hook configured to latch to a second wire rod of the panel.

6. The enclosure of claim 5 wherein
   when the body is in the disengaged position, the hook is spaced from the second wire rod, such that the door is capable of moving in an upward direction.

7. The enclosure of claim 1 wherein
   the body includes catch lips that are flanges protruding laterally from the body, the catch lips being configured to engage the handle when the handle is rotated into the disengaged position.

8. The enclosure of claim 1 wherein
   the same one of the plurality of horizontal and vertical rods of the panel or the door to which the latch is attached is a first wire rod of the panel, and the body includes a hook configured to latch to a second wire rod of the door.

* * * * *